(12) United States Patent
Kuhn et al.

(10) Patent No.: US 7,385,000 B2
(45) Date of Patent: Jun. 10, 2008

(54) SILICONE RUBBER COMPOSITION HAVING IMPROVED STORAGE STABILITY

(75) Inventors: Arvid Kuhn, Muehldorf (DE); Werner Guske, Simbach (DE); Stefan Dietl, Burghausen (DE)

(73) Assignee: Wacker Chemie AG, Munich (DE)

( * ) Notice: Subject to any disclaimer, the term of this patent is extended or adjusted under 35 U.S.C. 154(b) by 252 days.

(21) Appl. No.: 11/249,613

(22) Filed: Oct. 13, 2005

(65) Prior Publication Data

US 2006/0084745 A1    Apr. 20, 2006

(30) Foreign Application Priority Data

Oct. 14, 2004   (DE) ............... 10 2004 050 128

(51) Int. Cl.
*C08L 83/04* (2006.01)

(52) U.S. Cl. ............... 524/588; 524/437; 524/492; 524/493; 525/478; 528/15; 528/24; 528/31; 528/32

(58) Field of Classification Search ............... None
See application file for complete search history.

(56) References Cited

U.S. PATENT DOCUMENTS

| | | | |
|---|---|---|---|
| 3,268,473 A | | 8/1966 | Brown |
| 3,334,062 A | | 8/1967 | Brown et al. |
| 4,217,466 A | | 8/1980 | Kuhl |
| 5,668,205 A | * | 9/1997 | Yoshida et al. ............ 524/268 |
| 5,691,407 A | | 11/1997 | Azechi et al. |
| 5,721,300 A | | 2/1998 | Knies et al. |
| 5,973,030 A | * | 10/1999 | Matsushita et al. ......... 523/203 |
| 5,977,216 A | | 11/1999 | Meguriya et al. |
| 6,106,954 A | | 8/2000 | Meguriya et al. |
| 6,251,990 B1 | * | 6/2001 | Meguriya et al. ............ 524/862 |
| 6,252,028 B1 | * | 6/2001 | Fehn et al. .................. 528/15 |
| 2002/0187358 A1 | * | 12/2002 | Reitmeier et al. ............ 428/447 |

FOREIGN PATENT DOCUMENTS

| | | |
|---|---|---|
| CA | 2 314 264 A1 | 4/2000 |
| DE | 196 14 343 A1 | 10/1997 |
| DE | 197 40 631 A1 | 3/1999 |
| EP | 0 359 252 B1 | 9/1988 |
| EP | 0 787 772 A2 | 8/1997 |
| EP | 0 801 111 A1 | 10/1997 |
| EP | 0 928 008 | 7/1999 |
| EP | 0 928 008 A2 | 7/1999 |
| EP | 0 808 875 B1 | 9/1999 |
| EP | 1 077 226 B1 | 1/2002 |
| EP | 0 787 772 B1 | 9/2003 |
| EP | 0 808 868 B2 | 11/2003 |

OTHER PUBLICATIONS

Abstract and machine-generated translation for JP 9-284977.*
English Derwent Abstract AN 1999-205841 [18] corres. to EP 1 037 946 B1.
English Derwent Abstract AN 1997-491963 [46] corres. to DE 196 14 343 A1.
English Derwent Abstract AN 2001-283482 [30] corres. to 1 077 266 B1.
English Derwent Abstract AN 1990-085070 [12] corres. to EP 0 359 252 B1.

* cited by examiner

*Primary Examiner*—Marc S. Zimmer
(74) *Attorney, Agent, or Firm*—Brooks Kushman P.C.

(57) ABSTRACT

Silicone rubber compositions useful for high-voltage insulators, and which cure to give silicone rubbers having a low combustibility, are addition-crosslinkable or peroxide-crosslinkable silicone rubber compositions containing aluminum hydroxide as filler, with the uncrosslinked composition having a storage stability which is improved compared to the prior art and improved processing properties by including an acid, base, or a compound which liberates an acid or base upon heating. These improved properties are achieved both with surface-treated aluminum hydroxide and with untreated aluminum hydroxide.

21 Claims, No Drawings

SILICONE RUBBER COMPOSITION HAVING IMPROVED STORAGE STABILITY

BACKGROUND OF THE INVENTION

1. Field of the Invention

The invention relates to curable silicone rubber compositions for high-voltage insulators, which cure to give silicone rubbers having a low combustibility. More precisely, the invention relates to addition-crosslinkable or peroxide-crosslinkable silicone rubber compositions containing aluminum hydroxide as filler, with the uncrosslinked composition having a storage stability which is improved compared to the prior art and having improved processing properties as well, these improvements brought about through the use of special additives. These improved properties are achieved both with surface-treated aluminum hydroxide and with untreated aluminum hydroxide.

2. Background Art

Aluminum hydroxide, also known as aluminum trihydrate (ATH), is a stoichiometrically defined, crystalline aluminum hydroxide which is obtainable from precipitates produced by addition of bases to aluminum salt solutions or from bauxite, or an aluminum oxide hydrate, frequently referred to in industry as alumina hydrate, which has the composition $Al_2O_3.H_2O$ or $Al_2O_3.3 H_2O$ and can thus be regarded as a hydrated oxide and can be present as an amorphous constituent of aluminum minerals such as bauxite or alumogel.

Silicone rubber compositions containing aluminum hydroxide powder are already known. It is also known that such compositions cure by means of a curing agent, if appropriate with heating, to form a silicone rubber. The curing agent can be, for example, a peroxide or a combination of a transition metal-containing hydrosilylation catalyst and an organosiloxane comprising methylhydrogensiloxy groups. It is art known that some properties of crosslinked rubber which are necessary for use as, for example, high-voltage insulation or cable sheathing having a low combustibility, for arcing resistance, leakage current resistance and low combustibility, etc., can be improved considerably by addition of a sufficient amount of aluminum hydroxide powder to silicone rubber compositions.

It is known that the use of aluminum hydroxide as a filler brings with it a series of considerable disadvantages. Thus, for example, the processing properties of the uncrosslinked composition, e.g. milled sheet strength and tendency to stick to rollers, markedly deteriorate. As a result of aluminum hydroxide powder having hardly any reinforcing properties, the mechanical properties of the crosslinked rubber, e.g. ultimate tensile strength and elongation at break, become poorer.

The storage stability of the uncrosslinked compositions containing aluminum hydroxide also decreases. "Storage stability" refers to the time over which a composition can be stored under particular conditions, for example at a particular temperature, without the composition prematurely becoming undesirably partially or fully crosslinked or, conversely, without the composition any longer being crosslinkable, for example because components necessary for crosslinking have decomposed.

Both silicone rubber compositions containing untreated aluminum hydroxide and silicone rubber compositions containing aluminum hydroxide whose surface has been treated, for example with a silane, silazane or siloxane, with the aim of improving various properties of the composition or of the rubber, for example processability and storage qualities of the uncrosslinked composition, or dielectric and mechanical properties of the crosslinked rubber, are known to those skilled in the art.

The use of surface-treated aluminum hydroxide was mentioned as early as in the 1970s. U.S. Pat. No. 4,217,466 describes insulators whose screens comprise a silicone elastomer containing surface-treated aluminum hydroxide as filler. The treatment reagent is, for example, a vinylsilane.

In U.S. Pat. No. 5,691,407, addition-crosslinking silicone rubber compositions containing surface-treated aluminum hydroxide are disclosed. The reagent for surface treatment can be a silane or silazane, a titanium compound or a polysiloxane. The use of surface-treated aluminum hydroxide leads to improved electrical properties of the silicone rubber when used in high-voltage insulators. The use of previously surface-treated aluminum hydroxide is preferred, but it is also possible to use untreated aluminum hydroxide in combination with hexamethyldisilazane.

In European patent EP 0 787 772 B1 curable silicone rubber compositions which contain aluminum hydroxide but no further reinforcing fillers and which nevertheless have a good mechanical strength and excellent electrical properties are disclosed. The curing agent is a peroxide. The good mechanical properties are achieved essentially by the aluminum hydroxide powder being treated with a silane or siloxane having alkenyl groups and alkoxy or hydroxy groups, for example vinyltrimethoxysilane or vinyl-containing organosiloxanes having SiOH or Si—OR end groups. The aluminum hydroxide powder may have been pretreated with the reagent, or the treatment can be carried out in situ in the preparation of the silicone rubber composition. Comparative examples in which untreated aluminum hydroxide is used as filler display significantly poorer ultimate tensile strengths and tear propagation resistances. A rubber containing 150 parts of aluminum hydroxide powder per 100 parts of polydiorganosiloxane has an ultimate tensile strength of 5.1 MPa and a tear propagation resistance of 13 N/mm when the aluminum hydroxide has been treated and an ultimate tensile strength of only 1.7 MPa and a tear propagation of 8 N/mm when untreated aluminum hydroxide is used.

European patent EP 0 808 868 B2 discloses curable silicone rubber compositions containing aluminum hydroxide powder which has been surface-treated with an organosilane or organosilazane. The silane or silazane can also contain alkenyl groups, for example vinyltrimethoxysilane or tetramethyldivinyldisilazane. The curing agent can be, for example, a peroxide or a combination of a hydrosilylation catalyst and a polyorganosiloxane containing Si—H groups. The patent states that silicone rubber compositions containing conventional ATH are not stable because the aluminum hydroxide absorbs water and the electrical properties deteriorate as a result. Treatment of the aluminum hydroxide powder with an organosilane or organosilazane is described as central in order to achieve good water resistance and good electrical properties.

European patent EP 0 808 875 B1 describes silicone rubber compositions which can contain aluminum hydroxide and platinum compounds to achieve good flame resistance, these compositions still having sufficient flowability prior to curing to enable them to be processed readily. These compositions comprise polyorganosiloxane having a viscosity in the range from 100 and 100,000 mPa·s, pyrogenic silica, surface-treated zinc carbonate, a polyorganosiloxane containing Si—H groups and a platinum catalyst. Aluminum hydroxide and a further platinum compound are optional constituents of the composition. If aluminum hydroxide is used, it is surface-treated. The surface treatment of the zinc carbonate and of the aluminum hydroxide is critical for achieving the aim of the invention. Since these compositions slowly crosslink even at room temperature, an inhibitor such as ethynylcyclohexanol or triphenylphosphane can be added to prolong the processing time.

U.S. Pat. No. 5,668,205 discloses addition-crosslinking silicone rubber compositions which contain aluminum hydroxide and in addition a trimethylsilyl-terminated dimethylpolysiloxane to improve the electrical properties. Likewise described are peroxidic silicone rubber compositions containing aluminum hydroxide, in which a large part of the organopolysiloxanes bear trivinyl or divinylsilyl end groups and which may optionally further comprise a polysiloxane without unsaturated groups. Such compositions can be processed by injection molding and cured to give silicone rubbers which have improved electrical properties, especially when an insulator produced from the composition is used in an environment with severe atmospheric pollution. The aluminum hydroxide can be untreated or surface-treated. Polymers of this type having divinyl or trivinyl end groups are not customary starting materials in silicone chemistry. Their preparation is expensive and complicated and their use is thus not desirable.

In U.S. Pat. Nos. 5,977,216 and 5,668,205, addition-crosslinking compositions stabilized with ethynylcyclohexanol are disclosed. The keeping qualities of these compositions are not indicated. However, one skilled in the art knows that storage for a period of months will lead to slow crosslinking of the composition if the amount of ethynylcyclohexanol used is not so large as to cause a deterioration in the crosslinking characteristics on processing.

U.S. Pat. No. 5,977,216 states that aluminum hydroxide itself has no reinforcing properties. Thus, if very large amounts of aluminum hydroxide filler are used in the silicone rubber compositions in order to achieve the desired electrical properties, this results in silicone rubbers having low mechanical strength. This patent describes curable silicone rubber compositions containing aluminum hydroxide which has been treated with vinylsilazanes, for example tetramethyldivinyldisilazane, or vinylalkoxysilanes, for example vinyltrimethoxysilane, in such a way that from $1 \times 10^{-6}$ to $2 \times 10^{-4}$ mol of vinyl groups per gram of aluminum hydroxide are present on the surface. The aluminum hydroxide which has been modified in this way with vinyl groups then has reinforcing properties, so that the strength of the rubber does not suffer despite the high degree of fill. The ultimate tensile strength of the rubbers containing surface-treated aluminum hydroxide is from 45 to 58 kgf/cm$^2$ (corresponding to 4.41-5.69 N/mm$^2$) in the embodiments according to the invention, and from 18 to 25 kgf/cm$^2$ (1.76-2.45 N/mm$^2$) in the embodiments using untreated aluminum hydroxide. The examples describe ready-to-use addition-crosslinking compositions which comprise a hydrosilylation catalyst and an organopolysiloxane containing Si—H groups. To prevent immediate crosslinking of the composition, ethynylcyclohexanol is additionally present as inhibitor. It will be clear to one skilled in the art, that although addition of ethynylcyclohexanol can increase the pot life of the ready-to-use composition to a few days, storage over a number of months is not possible since this would require such a large amount of inhibitor that the crosslinking characteristics during processing would deteriorate.

European published specification EP 0 928 008 A2 describes silicone rubber compositions for high-voltage insulators in which aluminum hydroxide is surface-treated in situ. In the preparation of the compositions, untreated aluminum hydroxide is used in combination with an organosilane coupling agent. The surface of the aluminum hydroxide is hydrophobicized thereby, as a result of which the interaction of the aluminum hydroxide with the polysiloxane is improved and the dispersibility and reinforcing action of the aluminum hydroxide is therefore also improved.

U.S. Pat. No. 6,106,954 discloses addition-crosslinking organopolysiloxane compositions comprising surface-treated aluminum hydroxide, with the treatment reagent being an organosilane or organosilazane or a partial hydrolyzate of these reagents which is free of unsaturated groups. To improve the insulating properties, aluminum hydroxide is used in the silicone rubber. However, since aluminum hydroxide is intrinsically hygroscopic, the silicone rubber looses the insulating properties in a moist environment. As a result of the use of aluminum hydroxide which has been surface-treated as described above, the silicone rubber retains its insulating properties even under moist conditions.

European patent EP 1 037 946 B1 describes addition-crosslinking silicone rubber compositions containing aluminum hydroxide and, as further metal oxide, zinc oxide and optionally titanium dioxide. This composition enables disadvantages of the prior art described in the patent application, e.g. low storage stability and unsatisfactory leakage current resistance, to be overcome. In the example, the aluminum hydroxide is surface-treated in situ by means of an organosilazane. Although the poor storage stability of addition-crosslinking silicone rubber compositions filled with aluminum hydroxide in the prior art is described as one of the disadvantages which is to be overcome by this patent application, the composition is nevertheless prepared as a two component system in which a platinum catalyst is present in one component and a polyorganosiloxane crosslinker containing methylhydrogen units and an inhibitor are present in the other component. The ready-to-use composition produced by mixing the two components is processed immediately.

The addition of organic amines or salts thereof or similar compounds to silicone rubber compositions has been described long ago. In U.S. Pat. No. 3,268,473, ammonium carbonate or ammonium bicarbonate, for example, in combination with organosilicon compounds containing hydroxy groups is added to improve the stiffening behavior ("creep hardening"). U.S. Pat. No. 3,334,062 describes the addition of ammonium hydroxide, ammonium carbonate or ammonium carboxylates to a mixture of finely divided inorganic filler, for example silica, and cyclic organosiloxanes and heating of the mixture to up to 170° C. The process claimed comprises surface treatments of fillers (hydrophobicization) using exclusively cyclotrisiloxanes because of their increased reactivity due to ring stress.

Furthermore, German published specification DE 196 14 343 A1 describes polyorganosiloxane rubber compositions which cure thermally to give elastomers and contain from 0.01 to 1 part by weight of ammonium carbamate, alkali metal carbamate or alkaline earth metal carbamate per 100 parts by weight of a polyorganosiloxane. The carbamate is added to improve the strength of the milled sheet. Fillers present can be both nonreinforcing fillers, i.e. fillers having specific surface areas (BET) of up to 50 m$^2$/g, for example quartz, calcium silicate, metal oxide powders, and reinforcing fillers, i.e. fillers having surface areas (BET) of more than 50 m$^2$/g, e.g. silica or carbon black. The compositions are produced by mixing the constituents and subjecting the mixture to a heat treatment.

The necessity of stabilizing ready-to-use compositions is made clear in, for example, the European patent specification EP 1 077 226 B1. In the case of addition-crosslinking silicone compositions, crosslinking commences in the presence of a catalyst at the moment at which all necessary constituents are present together in one component (ready-to-use composition). The crosslinking rate of the composition then has to be adjusted by means of suitable additives (inhibitors) so that a pot life which is sufficiently long for the intended use results. One-component (ready-to-use) and simultaneously storage-stable compositions offer advantages in terms of logistics, since they have to be produced in finished form only shortly before processing. In the European patent EP 1 077 226 B1, this object is achieved by use of specific platinum catalysts by means of which the pot life is considerably increased compared to the use of customary catalysts. Here too, however, the pot life is limited.

The prior art thus describes a series of advantages in respect of low combustibility and electrical properties when using aluminum hydroxide as filler in silicone rubbers, but also the disadvantages in terms of processing properties and storage stability of the uncrosslinked rubber and mechanical properties of the vulcanized material which aluminum hydroxide brings with it. The prior art attempts to compensate these negative properties essentially by use of surface-treated aluminum hydroxide. However, a considerable disadvantage of such compositions containing surface-treated aluminum hydroxide is that the surface treatment of the aluminum hydroxide powder is an additional complicated and thus expensive process step. The surface treatment of the aluminum hydroxide powder is customarily effected by pretreatment or in-situ treatment with treatment agents such as silanes which are classified as harmful to health or toxic or form toxic substances during processing. Appropriate safety measures are therefore necessary.

It is accordingly advantageous to be able, firstly, to prepare a silicone rubber composition containing untreated aluminum hydroxide which has the same good properties as the compositions containing surface-treated aluminum hydroxide described in the prior art and, secondly, to improve properties such as processability and storage stability when using surface treated aluminum hydroxide.

SUMMARY OF THE INVENTION

Surprisingly, it has now been found that addition of suitable additives in the preparation of silicone rubber compositions filled with aluminum hydroxide significantly improves both the milled sheet strength, and the storage stability and processability of the uncrosslinked composition. This improvement in the properties is achieved both when using surface-treated aluminum hydroxide and when using untreated aluminum hydroxide. The improvement in the properties when using untreated aluminum hydroxide is particularly desirable, since in this case the prior art describes a series of considerable disadvantages compared to surface-treated aluminum hydroxide which can be compensated by the present invention. This applies not only to the properties of the uncrosslinked composition but also to the mechanical properties of the crosslinked rubber.

DETAILED DESCRIPTION OF THE PREFERRED EMBODIMENT(S)

The invention provides silicone rubber compositions for high voltage insulators, comprising (A) 100 parts by weight of at least one diorganopolysiloxane having the general formula (1)

$$R^1_a R^2_b SiO_{(4-a-b)/2} \tag{1}$$ 

where

R$^1$ is an unsubstituted or halogen-substituted monovalent hydrocarbon radical which has from 1 to 20 carbon atoms and is free of aliphatic unsaturated groups, R$^2$ is an unsubstituted or halogen-substituted monovalent hydrocarbon radical which contains at least one aliphatic carbon-carbon multiple bond, and a, b are each, independently of one another, a positive number, with the proviso that $1 \leq a < 3$, $0 < b \leq 1$ and $1 < a+b \leq 3$, with each molecule having on average at least two monovalent hydrocarbon radicals containing aliphatic carbon-carbon multiple bonds bound to silicon atoms, (B) from 1 to 100 parts by weight, based on 100 parts by weight of (A), of finely divided silica having a specific surface area, measured by the BET method, of 50-300 m$^2$/g, (C) 50-300 parts by weight, based on 100 parts by weight of (A), of at least one aluminum hydroxide powder having a specific surface area, measured by the BET method, of 0.1-20 m$^2$/g and an average particle size of 0.05 20 μm, (D) crosslinker(s) in an amount sufficient to cure the composition, with this crosslinker being selected from the group consisting of (D1) an organic peroxide, hydroperoxide or a mixture of various organic peroxides or hydroperoxides, (D2) a combination of an organohydrogenpolysiloxane having the general formula (2)

$$R^3_c H_d SiO_{(4-c-d)/2} \tag{2}$$ 

where

R$^3$ is a substituted or unsubstituted monovalent hydrocarbon radical which is not aliphatically unsaturated, c, d are each, independently of one another, a positive number, with the proviso that $1 \leq c < 3$, $0 < d \leq 1$ and $1 < c+d \leq 3$, and each molecule has on average at least three hydrogen atoms bound to silicon atoms, and a hydrosilylation catalyst comprising at least one transition metal, (E) 0.01-10.0 parts by weight, based on 100 parts by weight of (A), of an inorganic, organic or organosilicon base or acid or a compound which liberates an inorganic, organic or organosilicon base or acid on heating.

The constituent (A) of the silicone rubber composition of the invention preferably comprises a diorganopolysiloxane or mixture of diorganopolysiloxanes of the general formula (1):

$$R^1_a R^2_b SiO_{(4-a-b)/2}. \tag{1}$$ 

R$^1$ is a substituted or unsubstituted monovalent hydrocarbon radical which contains no aliphatically unsaturated groups. R$^2$ is a substituted or unsubstituted monovalent hydrocarbon radical which is aliphatically unsaturated, with each molecule having on average at least two such unsaturated groups bound to silicon atoms. The indices a and b are positive numbers in the ranges $1 \leq a < 3$, $0 < b \leq 1$ and $1 < a+b \leq 3$.

In particular, R$^1$ is a monovalent, SiC-bonded, substituted or unsubstituted hydrocarbon radical which has from 1 to 18 carbon atoms and is free of aliphatic carbon-carbon multiple bonds.

Examples of radicals $R^1$ are alkyl radicals such as the methyl, ethyl, n-propyl, isopropyl, 1-n-butyl, 2-n-butyl, isobutyl, tert-butyl, n-pentyl, isopentyl, neopentyl, and-tert-pentyl radicals, hexyl radicals such as the n-hexyl radical, heptyl radicals such as the n-heptyl radical, octyl radicals such as the n-octyl radical and isooctyl radicals, such as the 2,2,4-trimethylpentyl radical, nonyl radicals such as the n-nonyl radical, decyl radicals such as the n-decyl radical, dodecyl radicals, such as the n-dodecyl radical, and octadecyl radicals such as the n-octadecyl radical; cycloalkyl radicals such as cyclopentyl, cyclohexyl, cycloheptyl and methylcyclohexyl radicals; aryl radicals such as the phenyl, naphthyl, anthryl and phenanthryl radicals; alkaryl radicals such as the o-, m-, p-tolyl radicals, xylyl radicals and ethylphenyl radicals; and aralkyl radicals such as the benzyl radical, the α-phenylethyl radical and the β-phenylethyl radical.

Examples of substituted radicals $R^1$ are haloalkyl radicals such as the 3,3,3-trifluoro-n-propyl radical, the 2,2,2,2',2',2'-hexafluoroisopropyl radical, the heptafluoroisopropyl radical and haloaryl radicals such as the o-, m- and p-chlorophenyl radicals, and also all radicals mentioned above for $R^1$ which are preferably substituted by mercapto groups, epoxy-functional groups, carboxy groups, keto groups, enamine groups, amino groups, aminoethylamino groups, isocyanato groups, aryloxy groups, acryloxy groups, methacryloxy groups, hydroxy groups and halogens. The radical $R^1$ is preferably a monovalent hydrocarbon radical having from 1 to 6 carbon atoms, with the methyl radical being particularly preferred.

$R^2$ is, in particular, a monovalent, SiC-bonded hydrocarbon radical having an aliphatic carbon-carbon multiple bond. Examples of radicals $R^2$ are alkenyl radicals such as the vinyl, 5-hexenyl, cyclohexenyl, 1-propenyl, allyl, 3-butenyl and 4 pentenyl radicals, and alkynyl radicals such as the ethynyl, propargyl and 1-propynyl radicals. The radical $R^2$ is preferably an alkenyl radical, with the vinyl radical being particularly preferred.

In a preferred embodiment, $R^1$ is a methyl group and $R^2$ is a vinyl group. The structure of the diorganopolysiloxanes (A) can be linear or branched, with a linear structure being preferred. The viscosity of the diorganopolysiloxanes (A) at 25° C. (determined in accordance with DIN 53018) is preferably in the range from 1000 mPa·s to 50,000,000 mPa·s. In a preferred embodiment, the viscosity of the diorganopolysiloxanes (A) is in the range from 500,000 to 40,000,000 mPa·s, more preferably in the range from 2,000,000 to 30,000,000 mPa·s and thus in the range of the polysiloxanes customarily used in high-temperature-crosslinking rubbers (HTV rubbers).

In another embodiment, the viscosity of the diorganopolysiloxanes (A) at 25° C. (determined in accordance with DIN 53018) is preferably in the range from 1000 mPa·s to 100,000 mPa·s, more preferably in the range from 5000 to 50,000 mPa·s. Polysiloxanes in this viscosity range are usually used for liquid silicone rubbers (LSRs).

The diorganopolysiloxanes (A) can be, for example, vinyl-terminated polydimethylsiloxanes, vinyl-terminated polydimethyl-polymethylvinyl-siloxanes or trimethylsilyl-terminated polydimethyl-polymethylvinyl-siloxanes. The component (A) can consist of a single diorganopolysiloxane or of a mixture of two or more diorganopolysiloxanes.

Component (B) is a finely divided silica. Component (B) is used as reinforcing filler which gives the crosslinked silicone rubber sufficient mechanical strength. Examples of reinforcing fillers, i.e. fillers having a BET surface area of at least 50 m²/g, are pyrogenic silica, precipitated silica or silicon-aluminum mixed oxides having a BET surface area of more than 50 m²/g. The fillers mentioned can have been hydrophobicized, for example by treatment with organosilanes, organosilazanes or organosiloxanes or by etherification of hydroxyl groups to form alkoxy groups. Preference is given to pyrogenic silicas having a BET surface area of at least 100 m²/g.

The compositions of the invention preferably contain from 1 to 100 parts by weight, more preferably from 3 to 50 parts by weight of reinforcing fillers per 100 parts by weight of the component (A). In the case of an amount of less than one part by weight, the mechanical strength of the crosslinked rubber is unsatisfactory, while when more than 100 parts by weight are present the rubber becomes brittle. It is possible to use either one type of filler or else a mixture of at least two fillers.

The surface treatment of the silica can be carried out by means of silicon compounds containing saturated or unsaturated groups or by means of mixtures of such silicon compounds. When silicon compounds containing unsaturated groups are used, the treated silica has corresponding unsaturated groups on the surface. Untreated silica can be used in the preparation of the silicone rubber compositions in combination with such silicon compounds or hydroxy-terminated diorganosiloxane oligomers. The diorganosiloxane oligomers can in turn contain unsaturated groups.

Examples of hydroxy-terminated diorganosiloxane oligomers are dimethylhydroxysiloxy-terminated dimethylsiloxane oligomers, dimethylhydroxysiloxy-terminated dimethylsiloxane-methylvinylsiloxane copolymer oligomers or hydroxy-terminated methylvinylsiloxane oligomers.

In the siloxane oligomers containing unsaturated groups, the proportion of siloxane units bearing such unsaturated groups is preferably in the range from 1 to 50 mol %, more preferably from 4 to 20 mol %. The viscosity of the oligomers is preferably in the range from 5 to 500 mPa·s, more preferably from 15 to 60 mPa·s. In the surface treatment of the silica, the treatment reagents are preferably selected so that at least part of the silicon compounds or siloxane oligomers used contain unsaturated groups. Preference is given to a proportion of treatment reagents bearing unsaturated groups of at least 10% by weight, particularly preferably at least 30% by weight. If the surface of the silica is modified at least partially with unsaturated groups, the mechanical properties of the crosslinked silicone rubber compositions are improved even when using untreated aluminum hydroxide powder.

Component (C) of the composition of the invention is critical for giving the crosslinked rubber the electrical properties necessary for use as insulator, e.g. arcing resistance and leakage current resistance. Component (C) is aluminum hydroxide powder, also known under the name aluminum trihydrate (ATH), and is usually described by the general formula (3) or (4):

$$Al(OH)_3 \quad (3)$$

$$Al_2O_3 \cdot 3\,H_2O \quad (4)$$

The aluminum hydroxide can further comprise mixed oxides such as aluminum oxide hydrate AlO(OH). Aluminum hydroxide which has, for example, been surface-treated with silanes or silazanes is usually used in silicone rubber compositions. The composition of the present invention can contain either aluminum hydroxide which has been surface-treated in this way or aluminum hydroxide which has not been surface-treated. Surface-treated aluminum hydroxide is, for example, obtainable under the trade names Hymod®

632 SP (J. M. Huber Corporation, Edison N.J./U.S.A.), Martinal® OL 104/A, OL 104/C or OL 104/S (both from Martinswerk GmbH, Bergheim/Germany) or Trefil 744 (Quarzwerke GmbH, Frechen/Germany).

Untreated aluminum hydroxide is, for example, obtainable under the trade names, Apyral 40 CD (Nabaltec GmbH, Schwandorf/Germany), Martinal OL-107 or Martinal OL-104 (both from Martinswerk GmbH, Bergheim/Germany) or Micral 632 (J. M. Huber Corporation, Edison N.J./U.S.A.).

The aluminum hydroxide powder used preferably has an average particle size of 0.05-20 µm, more preferably 1-15 µm. The specific surface area, measured by the BET method, of the aluminum hydroxide powder is preferably 0.1-20 m²/g, more preferably 1-10 m²/g. At average particle sizes above 20 µm or specific surface areas below 0.1 m²/g, the particles are so large that the aluminum hydroxide powder may no longer be able to be dispersed homogeneously in the silicone rubber. In the case of average particle sizes below 0.05 µm or specific surface areas above 20 m²/g, the aluminum hydroxide present can have an increased effect on the mechanical properties of the rubber.

Preference is given to using 50-300 parts by weight of the component (C) per 100 parts by weight of the component (A). Greater preference is given to 80-250 parts by weight, most preferably 90-200 parts by weight. In the case of excessively high proportions of aluminum hydroxide, the processability of the composition and the mechanical properties of the crosslinked rubber deteriorate, while if the proportion of aluminum hydroxide is too low, the improvement in the electrical properties of the rubber is unsatisfactory. Component (C) can be used as a single aluminum hydroxide powder or as a combination of different aluminum hydroxide powders, for example aluminum hydroxide powders having different particle sizes or specific surface areas or having different morphologies.

Component (D) is a crosslinker which is added in an amount which is sufficient to cure the composition, if appropriate at elevated temperature. Preference is given to crosslinkers which cure the composition only at elevated temperature, since this improves the storage stability of the uncrosslinked composition. Component (D) can be, for example, an organic or inorganic peroxide or a combination of an organohydrogenpolysiloxane and at least one hydrosilylation catalyst comprising a transition metal.

If component (D) is a peroxide, it is preferably selected from the group consisting of dialkyl peroxides, diaryl peroxides, alkyl aryl peroxides, aralkyl peroxides, and hydroperoxides. It is possible to use a single peroxide or hydroperoxide or a combination of various peroxides or peroxides with hydroperoxides as component (D). The proportion of component (D) when (D) is a peroxide is preferably from 0.1 to 80 parts by weight more preferably from 0.5 to 40 parts by weight, in each case based on 100 parts by weight of (A).

Examples of organic peroxides are acyl peroxides such as dibenzoyl peroxide, bis(4-chlorobenzoyl) peroxide, bis(2,4-dichlorobenzoyl) peroxide and bis(4-methylbenzoyl) peroxide; alkyl peroxides and aryl peroxides, e.g. di-tert-butyl peroxide, 2,5-bis(tert-butylperoxy)-2,5-dimethylhexane, dicumyl peroxide and 1,3-bis(tert-butylperoxyisopropyl) benzene; perketals such as 1,1-bis(tert-butylperoxy)-3,3,5-trimethylcyclohexane; peresters such as diacetyl peroxydicarbonate, tert-butyl perbenzoate, tert-butyl peroxyisopropylcarbonate, tert-butyl peroxyisononanoate, dicyclohexyl peroxydicarbonate and 2,5-dimethylhexane 2,5-diperbenzoate.

If the rubber composition is addition-crosslinking, the component (D) comprises a combination of an organohydrogenpolysiloxane and a hydrosilylation catalyst comprising at least one transition metal. The organohydrogenpolysiloxane has the general formula (2)

$$R_c^3 H_d SiO_{(4-c-d)/2} \qquad (2)$$

where $R^3$ is a substituted or unsubstituted monovalent hydrocarbon radical which is not aliphatically unsaturated. Each molecule has on average at least three hydrogen atoms bound to silicon atoms. The indices a and b are positive numbers, with the proviso that the inequalities $1 \leq c < 3$, $0 < d \leq 1$ and $1 < c+d \leq 3$ are obeyed.

Examples of $R^3$ are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical and octadecyl radicals such as the n-octadecyl radical; cycloalkyl radicals such as the cyclopentyl, cyclohexyl, cycloheptyl and methylcyclohexyl radicals; aryl radicals such as the phenyl, naphthyl, anthryl and phenanthryl radicals; alkaryl radicals such as o-, m-, p-tolyl radicals, xylyl radicals and ethylphenyl radicals; and aralkyl radicals such as the benzyl radical, the α-phenylethyl radical and the β-phenylethyl radical.

Examples of substituted radicals $R^3$ are haloalkyl radicals such as the 3,3,3-trifluoro-n-propyl radical, the 2,2,2,2',2',2'-hexafluoroisopropyl radical, the heptafluoroisopropyl radical, and haloaryl radicals such as the o-, m- and p-chlorophenyl radicals, and also all radicals mentioned above for $R^3$ which are preferably substituted by mercapto groups, epoxy-functional groups, carboxy groups, keto groups, enamine groups, amino groups, aminoethylamino groups, isocyanato groups, aryloxy groups, acryloxy groups, methacryloxy groups, hydroxy groups and halogen atoms.

The organohydrogenpolysiloxane of the general formula (2) is preferably added so that an excess of Si—H over vinyl groups is contained in the curable rubber.

As catalysts which promote the addition of Si-bonded hydrogen onto aliphatic multiple bonds in the process of the invention, it is possible to use any catalyst which promotes the addition of Si-bonded hydrogen onto aliphatic multiple bonds. The catalyst is preferably a metal of the platinum metal group or a compound or a complex of a metal of the platinum group. Examples of such catalysts are metallic and finely divided platinum, which may be present on supports such as silicon dioxide, aluminum oxide or activated carbon, compounds or complexes of platinum, for example platinum halides, e.g. $PtCl_4$, $H_2PtCl_6 \cdot 6H_2O$, $Na_2PtCl_4 \cdot 4H_2O$, platinum-olefin complexes, platinum-alcohol complexes, platinum-alkoxide complexes, platinum-ether complexes, platinum-aldehyde complexes, platinum-ketone complexes including reaction products of $H_2PtCl_6 \cdot 6H_2O$ and cyclohexanone, platinum-vinylsiloxane complexes such as platinum-1,3-divinyl-1,1,3,3-tetramethyldisiloxane complexes with or without a content of detectable inorganically bound halogen, bis(gamma-picoline)platinum dichloride, trimethylenedipyridineplatinum dichloride, dicyclopentadieneplatinum dichloride, (dimethyl sulfoxide)(ethylene)platinum(II) dichloride, cyclooctadieneplatinum dichloride, norbornadieneplatinum dichloride, gamma-picolineplatinum dichloride, cyclopentadieneplatinum dichloride, and also reaction products of platinum tetrachloride with olefin and primary amine or secondary amine or primary and secondary amine, for example the reaction product of platinum tetrachloride dissolved in 1-octene with sec-butylamine, or ammonium-platinum complexes. The catalyst is preferably used in catalytic amounts in the process of the invention.

Particular preference is given to hydrosilylation catalysts which are inert at the storage temperature of the uncrosslinked rubber, preferably below 40° C., but catalyze the composition sufficiently quickly at elevated temperatures. Examples of such hydrosilylation catalysts are platinum compounds selected from the group consisting of compounds of the formula (5)

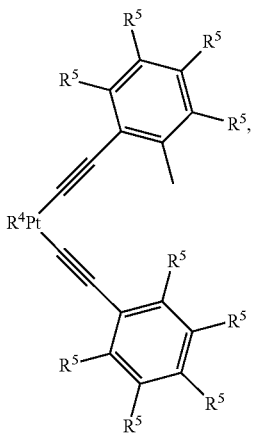

and/or oligomeric or polymeric compounds composed of structural units of the general formula (6)

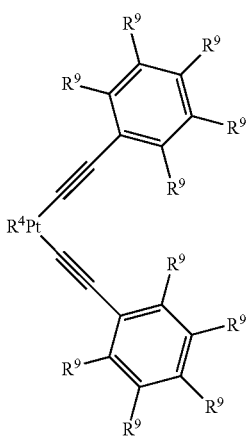

and optionally structural units of the general formula (7)

where $R^4$ is a substituted or unsubstituted diene which is bound to platinum by means of at least one π bond and has an unbranched or branched chain having from 4 to 18 carbon atoms, or a ring having from 6 to 28 carbon atoms, the radicals $R^5$ can be identical or different and are each a hydrogen atom, a halogen atom, $-SiR^6_3$, $-OR^8$ or a monovalent, substituted or unsubstituted hydrocarbon radical having from 1 to 24 carbon atoms, with the proviso that at least one radical $R^5$ in the compounds of the formula (5) is $-SiR^6_3$, the radicals $R^6$ can be identical or different and are each hydrogen, a halogen atom, $-OR^8$ or a monovalent, substituted or unsubstituted hydrocarbon radical having from 1 to 24 carbon atoms, the radicals $R^8$ can be identical or different and are each a hydrogen atom, $-SiR^6_3$ or a monovalent, substituted or unsubstituted hydrocarbon radical having from 1 to 20 carbon atoms, the radicals $R^9$ can be identical or different and are each a hydrogen atom, a halogen atom, $-SiR^6_3$, $SiR^6_{(3-t)}[R^{10}SiR^{11}_sO_{(3-s)/2}]_t$, $-OR^8$ or a monovalent substitute or unsubstituted hydrocarbon radical having from 1 to 24 carbon atoms, with the proviso that at least one radical $R^9$ in the formula (6) is $-SiR^6_{(3-t)}[R^{10}SiR^{11}_sO_{(3-s)/2}]_t$, the radicals $R^{10}$ can be identical or different and are each oxygen or a divalent, substituted or unsubstituted hydrocarbon radical which has from 1 to 24 carbon atoms and can be bound to the silicon via an oxygen atom, the radicals $R^{11}$ can be identical or different and are each hydrogen or an organic radical, r is 0, 1, 2 or 3, s is 0, 1, 2 or 3 and t is 1, 2 or 3.

The term organopolysiloxanes encompasses polymeric, oligomeric and also dimeric siloxanes.

If $R^4$ is a substituted diene or the radicals $R^5$, $R^6$, $R^7$, $R^8$, $R^9$ and $R^{10}$ are substituted hydrocarbon radicals, preferred substituents are halogen atoms such as F, Cl, Br and I, cyano radicals, $-NR^8_2$, heteroatoms such as O, S, N and P and also $-OR^8$ groups, where $R^8$ is as defined above.

Examples of $R^4$ are dienes such as 1,3-butadiene, 1,4-diphenyl-1,3-butadiene, 1,3-cyclohexadiene, 1,4-cyclohexadiene, 2,4-hexadiene, 1,4-hexadiene, 1,5-hexadiene, 2,5-dimethyl-2,4-hexadiene, α- and γ-terpenes, (R)-(+)-4-isopropenyl-1-methyl-1-cyclohexene, (S)-(−)-4-isopropenyl-1-methyl-1-cyclohexene, 4 vinyl-1-cyclohexene, 2,5-heptadiene, 1,5-cyclooctadiene, 1-chloro-1,5-cyclooctadiene, 1,5-dimethyl-1,5-cyclooctadiene, 1,6-dimethyl-1,5-cyclooctadiene, 1,5-dichloro-1,5-cyclooctadiene, 5,8-dihydro-1,4-dioxocin, η⁴-1,3,5,7-cyclooctatetraene, η⁴-1,3,5-cycloheptatriene, η⁴-1-fluoro-1,3,5,7-cyclooctatetraene, η⁴-1,2,4,7-tetramethyl-1,3,5,7-cyclooctatetraene, 1,8-cyclotetradecadiene, 1,9-cyclohexadecadiene, 1,13-cyclotetracosadiene, η⁴-1,5,9-cyclododecatriene, η⁴-1,5,10-trimethyl-1,5,9-cyclododecatriene, η⁴-1,5,9,13-cyclohexadecatetraene, bicyclo[2.2.1]hepta-2,5-diene, 1,3-dodecadiene, methylcyclopentadiene dimer, 4,7-methylene-4,7,8,9-tetrahydro indene, bicyclo[4.2.2]deca-3,9-diene-7,8-dicarboxlic anhydride, alkyl bicyclo[4.2.2]deca-3,9-diene-7,8-dicarboxylates and alkyl bicyclo[4.2.2]deca-3,7,9-triene-7,8-dicarboxylates.

The diene $R^4$ is preferably 1,5-cyclooctadiene, 1,5-dimethyl-1,5-cyclooctadiene, 1,6-dimethyl-1,5-cyclooctadiene, 1-chloro-1,5-cyclooctadiene, 1,5-dichloro-1,5-cyclooctadiene, 1,8-cyclotetradecadiene, 1,9-cyclohexadecadiene, 1,13-cyclotetracosadiene, bicyclo[2.2.1]hepta-2,5-diene, 4-vinyl-1-cyclohexene, and η⁴-1,3,5,7-cyclooctatetraene, with 1,5-cyclooctadiene, bicyclo[2.2.1]hepta-2,5-diene, 1,5-dimethyl-1,5-cyclooctadiene, 1,6-dimethyl-1,5-cyclooctadiene being particularly preferred.

Examples of $R^5$ are alkyl radicals such as the methyl, ethyl, n-propyl, isopropyl, 1-n-butyl, 2-n-butyl, isobutyl, tert butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4 trimethylpentyl radical, nonyl radicals such as the n-nonyl radical, decyl radicals such as the n-decyl radical, cycloalkyl radicals such as cyclopropyl, cyclopentyl, cyclohexyl, cycloheptyl and methylcyclohexyl radicals, unsaturated radicals such as the allyl, 5-hexenyl, 7-octenyl, cyclohexenyl and styryl radicals, aryl radicals such as phenyl radicals, o-, m-, p-tolyl radicals, xylyl radicals and ethylphenyl radicals, aralkyl radicals such as the benzyl radical and the α-phenylethyl radical and the β-phenylethyl radical and also radicals of the formula —C($R^1$)=$CR^1_2$; further examples of $R^5$ are —$OR^8$ radicals such as hydroxy, methoxy, ethoxy, isopropoxy, butoxy and phenoxy radicals.

Examples of halogenated radicals $R^5$ are haloalkyl radicals such as the 3,3,3-trifluoro-n-propyl radical, the 2,2,2, 2',2',2'-hexafluoroisopropyl radical, the heptafluoroisopropyl radical, and haloaryl radicals such as the o-, m-, and p-chlorophenyl radicals.

Examples of silyl radicals $R^5$ are trimethylsilyl, ethyldimethylsilyl, methoxydimethylsilyl, n-propyldimethylsilyl, isopropyldimethylsilyl, n-butyldimethylsilyl, tert-butyldimethylsilyl, octyldimethylsilyl, vinyldimethylsilyl, phenyldimethylsilyl, diphenylmethylsilyl, hydroxypropyldimethylsilyl, methylvinylphenylsilyl and methoxypropylsilyl radicals.

The radical $R^5$ is preferably a hydrogen atom, a hydroxy radical, a methoxy radical or a hydrocarbon radical having from 1 to 8 carbon atoms or else a trimethylsilyl, ethyldimethylsilyl, butyldimethylsilyl, octyldimethylsilyl radical, with particular preference being given to a hydrogen atom, the methyl radical and the trimethylsilyl radical.

The radical $R^6$ is preferably a monovalent hydrocarbon radical having from 1 to 24 carbon atoms, e.g. one of the examples given for the radical $R^5$, a substituted hydrocarbon radical such as the hydroxypropyl or chloropropyl radical or a —$OR^8$ radical such as the hydroxy, methoxy or ethoxy radical, with particular preference being given to the methyl, ethyl, butyl, octyl, methoxy, ethoxy and hydroxypropyl radicals.

Examples of radicals $R^8$ are the radicals indicated for $R^5$. $R^8$ is preferably a hydrogen atom, an alkyl radical or an aryl radical, with particular preference being given to a hydrogen atom, the methyl radical and the ethyl radical.

Examples of radicals $R^9$ are the radicals indicated for $R^5$ and also the 1-trimethylsiloxypropyl-3-dimethylsilyl, 1-ethyldimethyl-siloxypropyl-3-dimethylsilyl, 1-methoxydimethylsiloxypropyl-3-dimethylsilyl and pentamethyldisiloxanyl radicals. $R^9$ is preferably a monovalent radical such as a hydrogen atom, a methyl, methoxy, trimethylsilyl, octyldimethylsilyl, dimethylmethoxysilyl, 1-trimethylsiloxypropyl-3-dimethylsilyl or hydroxypropyldimethylsilyl radical or a polyvalent radical such as —$C_2H_4$—, —Si(Me)$_2$—O—Si(Me)$_2O_{1/2}$, Si(Me)$_2$—CH$_2$—CH$_2$—CH$_2$—O—Si(Me)$_2$O$_{1/2}$, —Si(Me)$_2$—O—Si(Me)O$_{2/2}$, —Si(Me)$_2$—O—SiO$_{3/2}$, —Si(Me)$_2$—CH$_2$—CH$_2$—Si(Me)$_2$O$_{1/2}$ and —Si(Me)$_2$—CH$_2$—CH$_2$—Si(Me)O$_{2/2}$, where Me is a methyl radical.

Examples of radicals $R^{10}$ are the oxygen atom and also —CH$_2$—, —C$_2$H$_4$—, —C$_3$H$_6$—, —C$_4$H$_8$—, —C$_6$H$_{12}$—, —C$_6$H$_4$—, —CH$_2$CH(CH$_3$)—C$_6$H$_4$—CH(CH$_3$)CH$_2$— and —(CH$_2$)$_3$O—, with particular preference being given to the oxygen atom, —C$_2$H$_4$—, —C$_3$H$_6$— and —(CH$_2$)$_3$O—.

Examples of radicals $R^{11}$ are the hydrogen atom and also the examples given for the radicals $R^1$ and $R^2$. $R^{11}$ is preferably a monovalent hydrocarbon radical having from 1 to 12 carbon atoms, with particular preference being given to the methyl, ethyl, phenyl and vinyl radicals.

Examples of units of the formula (7) are SiO$_{4/2}$—, (Me)$_3$SiO$_{1/2}$—, Vi(Me)$_2$SiO$_{1/2}$—, Ph(Me)$_2$SiO$_{1/2}$—, (Me)$_2$SiO$_{2/2}$—, Ph(Me)SiO$_{2/2}$—, Vi(Me)SiO$_{2/2}$—, H(Me)SiO$_{2/2}$—, MeSiO$_{3/2}$—, PhSiO$_{3/2}$—, ViSiO$_{3/2}$—, (Me)$_2$(MeO)SiO$_{1/2}$— and OH(Me)$_2$SiO$_{1/2}$—, with (Me)$_3$SiO$_{1/2}$—, Vi(Me)$_2$SiO$_{1/2}$—, (Me)$_2$SiO$_{2/2}$—, Ph(Me)SiO$_{2/2}$—, Vi(Me)SiO$_{2/2}$— and Me$_2$(MeO)SiO$_{1/2}$-MeSiO$_{3/2}$— being preferred and (Me)$_3$SiO$_{1/2}$—, Vi(Me)$_2$SiO$_{1/2}$—, (Me)$_2$SiO$_{2/2}$— and Vi(Me)SiO$_{2/2}$— being particularly preferred, where Me is the methyl radical, Vi is the vinyl radical and Ph is the phenyl radical.

If a hydrosilylation catalyst having one of the formulae (5) to (7) is used as constituent (D), it is preferably a bis(alkynyl) (1,5-cyclooctadiene) platinum, bis(alkynyl)(bicyclo[2.2.1]hepta-2,5-diene)platinum, bis(alkynyl)(1,5-dimethyl-1,5-cyclooctadiene)platinum or bis(alkynyl)(1,6-dimethyl-1,5-cyclooctadiene)platinum complex.

The constituent (E) is essential for achieving the improved properties of the composition compared to the prior art. Constituent (E) is an inorganic, organic or organosilicon base or acid or a compound which liberates an inorganic, organic or organosilicon base or acid. Suitable bases are alkali metal hydroxides and alkaline earth metal hydroxides and ammonium hydroxide. Preference is given to relatively weak bases such as organic amines and ammonia and salts of organic amines and ammonium compounds NH$_4$X.

Examples of organic amines are primary, secondary or tertiary aliphatic amines, for example dimethylamine, trimethylamine, N,N-dimethylethylamine, ethylamine, diethylamine, triethylamine, ethanolamine, propylamine, dipropylamine, isopropylamine, diisopropylamine, butylamine, sec-butylamine, tert-butylamine, dibutylamine, tributylamine, cyclohexylamine, methylcyclohexylamine, dimethylcyclohexylamine, 1-aminooctane, 2-aminooctane, compounds having two amino groups, for example ethylenediamine, tetramethylethylenediamine and their higher homologues; cyclic amines such as piperazine, piperidine, 4 piperidone, 2,2,6,6-tetramethyl-4-piperidone, pyrrolidine, aminopyrrolidine, morpholine and their alkyl derivatives; aromatic amines such as aniline, dimethylaniline, toluidines, pyridine and their alkyl derivatives, urea and N alkylurea derivatives. Preference is given to ammonia and the relatively volatile amines which can easily be removed again from the rubber.

Possible bases also include salts of these amines and ammonium compounds NH$_4$X, where X is, for example, one of the acid radicals mentioned below. Preferred examples are ammonium carbonate, ammonium hydrogencarbonate, ammonium carbamate, and ammonium carboxylates such as ammonium formate and ammonium acetate.

Examples of acids are sulfonic acids or mineral acids. Preference is given to relatively weak acids which have a lower tendency to cause degradation of the polysiloxane chains, for example carboxylic acids such as oxalic acid or even more preferably still weaker acids such as maleic acid, fumaric acid, malonic acid, formic acid, acetic acid, propionic acid, higher homologues of the monocarboxylic acids, and also further dicarboxylic acids such as succinic acid, glutaric acid, adipic acid, and hydroxycarboxylic acids such as glycolic acid, malic acid, citric acid, lactic acid, tartaric acid or salicylic acid.

Examples of organosilicon acids or bases are aminosilanes such as aminopropyltrimethoxysilane, aminopropyltriethoxysilane, N-aminoethylaminopropyltrimethoxysilane, N-aminoethylaminopropyltriethoxysilane, aminopropyltrimethylsilane, acylaminosilanes R$^{12}$$_3$SiNR$^{13}$C=O—R$^{14}$, where R$^{12}$ can be the same as R$^1$ or R$^6$ and R$^{13}$ and R$^{14}$ can each be, independently of one another, the same as R$^1$ or R$^5$, for example N-trimethylsilylacetamide and N-trimethylsilylformamide, N-triorganosilylcarbamic esters, triorganosilyl N-triorganosilylcarbamates, N-triorganosilylureas, for example N,N'-dimethyl-N,N'-bis(trimethylsilyl)urea, dimethyltrimethylsilylamine, hexamethyldisilazane or divinyltetramethyldisilazane.

Preference is given to acids or bases which, owing to their acid or base strength, have no pronounced tendency to cause degradation of the polysiloxane chain. Preference is also given to volatile compounds or compounds which liberate volatile or particularly preferably gaseous bases or acids, e.g. ammonia, on heating. Particular preference is therefore given to salts which decompose thermally, for example ammonium carbonate, ammonium hydrogencarbonate, ammonium acetate or ammonium carbamate. Very particular preference is given to ammonium carbamate.

The constituent (E) is used in an amount of 0.01-10.0 parts by weight, based on 100 parts by weight of (A). Preference is given to using 0.1-6.0 parts by weight, more preferably 1.0-4.5 parts by weight, based on 100 parts by weight of (A). If less than 0.01 part by weight is used, the additive displays no effect according to the invention, while in the case of more than 10 parts by weight, the inhibiting action on the crosslinking system is too strong and can sometimes also result in a deterioration in the mechanical properties due to chain degradation.

If the constituent (E) is a nitrogen-containing compound, for example an amine, ammonium salt or silazane, the composition after its preparation has a correspondingly increased nitrogen content. At an excessively high nitrogen content of above 1000 ppm, the crosslinking characteristics of the composition and the mechanical strength of the crosslinked rubber are adversely affected. In the case of an excessively low content below 10 ppm, the constituent (E) does not display the effect according to the invention. The silicone rubber composition therefore preferably contains at least 10 ppm and not more than 1000 ppm of nitrogen, more preferably at least 20 and not more than 500 ppm of nitrogen.

Apart from the constituents (A) to (E), further constituents can optionally be incorporated into the composition.

As an optional constituent (F), it is possible to use an inhibitor which regulates the crosslinking rate. As agents which slow down the addition of Si-bonded hydrogen onto aliphatic multiple bonds at room temperature, known as inhibitors, it is possible to use any inhibitor which performs this function.

Examples of inhibitors are 1,3-divinyl-1,1,3,3-tetramethyldisiloxane, benzotriazole, dialkylformamides, alkylthioureas, methyl ethyl ketoxime, organic or organosilicon compounds having a boiling point of at least 25° C. at 1012 mbar (abs.) and at least one aliphatic triple bond, for example 1-ethynylcyclohexan-1-ol, 2-methyl-3-butyn-2-ol, 3-methyl-1-pentyn-3-ol, 2,5-dimethyl-3-hexyne-2,5-diol and 3,5-dimethyl-1-hexyn-3-ol, 3,7-dimethyloct-1-yn-6-en-3-ol, a mixture of diallyl maleate and vinyl acetate, maleic monoesters, and inhibitors such as the compound of the formula HC≡C—C(CH$_3$)(OH)—CH$_2$—CH$_2$—CH=C(CH$_3$)$_2$, obtainable, for example, under the trade name "Dehydrolinalool" (BASF AG, Ludwigshafen/Germany).

Preferred constituents (F) are ethynylcyclohexanol (ECH), dehydrolinalool, 3-methyldodecynol or a diorganosiloxane oligomer which has an average chain length of up to 50 siloxy units and bears 3-methyl-3-hydroxybut-1-yn-4-oxy groups at the ends of the chain. Particular preference is given to ethynylcyclohexanol and the diorganosiloxane oligomer bearing 3-methyl-3-hydroxybut-1-yn-4-oxy groups at the ends of the chain.

As an optional constituent (G), it is possible to use additives which effect a further improvement in the electrical properties, heat resistance, or the flammability resistance. These additives can be, for example, metal oxides or metal hydroxides, e.g. antimony trioxide, cerium oxide, magnesium oxide, magnesium hydroxide, titanium dioxide, zinc oxide, zirconium dioxide, or metal or transition metal compounds such as compounds of palladium or platinum, if appropriate in combination with organic compounds which regulate the activity of these compounds in hydrosilylation reactions, or combinations of such additives. By the term "metal oxide" in the sense used in the present application, this term does not include reinforcing silica, nor does it include hydrated aluminum oxide.

Among metal oxides, preference is given to titanium dioxide. In a preferred embodiment, constituent (G) comprises the reaction product of a platinum compound or a platinum complex with an organosilicon compound which has basic nitrogen bound to the silicon via carbon or comprises a combination of such a reaction product with titanium dioxide. Examples of such platinum compounds or platinum complexes are the H$_2$[PtCl$_6$].6 H$_2$O, platinum-olefin complexes, platinum-alcohol complexes, platinum-alkoxide complexes, platinum-ether complexes, platinum-vinylsiloxane complexes, in particular platinum-1,3-divinyl-1,1,3,3-tetramethyldisiloxane complexes described, for example, in the European patent specification EP 0 359 252 B1 or the cyclooctadiene complexes of platinum having acetylide ligands, in particular bis(alkynyl)(1,5-cyclooctadiene)platinum complexes described, for example, in the European patent specification EP 1 077 226 B1. Preference is given to platinum-1,3-divinyl-1,1,3,3-tetramethyldisiloxane complexes or cyclooctadiene complexes of platinum having acetylide ligands.

Examples of organosilicon compounds which have basic nitrogen bound to silicon via carbon are N-(2-aminoethyl)-3-aminopropyltrimethoxysilane, N-(2-aminoethyl)-3-aminopropyltriethoxysilane, N-(2-aminoethyl)-3-aminopropylmethyldimethoxysilane, 3-aminopropyltrimethoxysilane, 3-aminopropyltriethoxysilane, N-(cyclohexyl)-3-aminopropyltrimethoxysilane, N-(2-aminoethyl)-3-aminopropyltris(trimethylsiloxy)silane, 1,2-bis[N-(2-aminoethyl)-3-aminopropyl]-1,1,2,2-tetramethyldisiloxane, N,N'-bis(3-(trimethoxysilyl)propyl)-1,2-ethanediamine, N,N-bis(3-(trimethoxysilyl)propyl)-1,2-ethanediamine and N,N'-bis(3-(trimethoxysilyl)propyl)urea. Preference is given 3-aminopropyltrimethoxysilane, 3-aminopropyltriethoxysilane and N,N'-bis(3-(trimethoxysilyl)propyl)-1,2-ethanediamine, with particular preference given to N-(2-aminoethyl)-3-aminopropyltrimethoxysilane and N-(2-aminoethyl)-3-aminopropyltriethoxysilane.

As a further optional constituent (H), it is possible for further nonreinforcing fillers and pigments to be present, as long as they do not adversely affect the desired properties of the composition or the crosslinked rubber. The further constituents (H) can be present in amounts of from 0.001 to 100 parts by weight, based on 100 parts by weight of (A). Examples of further constituents (H) are carbon black, graphite, quartz flour, metal salts of carboxylic acids, for example, calcium stearate, metal oxides or mixed oxides, e.g. iron oxides, cobalt-aluminum oxide spinels, cobalt-iron-chromium spinels, aluminum-chromium-cobalt spinels and other spinels, cerium oxide, chromium oxide, titanium dioxide and vanadium oxide, and also processing aids such as nonfunctional polydimethylsiloxanes, hydroxy-terminated polydimethylsiloxane oils, hydroxy-terminated polydimethylmethylvinylsiloxane oils, mold release agents and plasticizers.

The composition of the invention can be prepared by simple mixing of the constituents in a mixing apparatus customarily used for silicone rubber compositions, e.g. kneaders, extruders, and two-roll mills. Preference is given to a preparation in which the constituents (A), (B) and (C) together with (E) and, if appropriate, optional constituents (F)-(H) are intimately mixed in a kneader until homogeneous.

Preference is given to a preparation in which the constituent (E) together with the constituents (A), (B) and (C) and, if appropriate, further optional constituents are intimately mixed in a suitable mixing apparatus, for example in a kneader. For the constituent (E) to be particularly effective, the temperature during the mixing procedure is above 50° C., preferably above 75° C., more preferably above 85° C., for from 10 minutes to 5 hours, preferably from 15 minutes to one hour. This applies particularly in the case of compounds which liberate volatile acids or bases on heating, e.g. salts of organic amines or ammonia salts such as ammonium carbonate, ammonium hydrogencarbonate or ammonium carbamate. Such compounds which are solid at room temperature have to be completely melted in the mixing procedure, since otherwise poorer mechanical properties of the future vulcanized product result. After discharge of the composition from the kneader, this preproduct is finished by addition of constituent (D) on a roll mill, with the temperature of the composition having to remain below the temperature at which incipient crosslinking of the composition takes place. The optional constituents (F)-(H) can also be added together with constituent (D) on the roll mill instead of in the first step.

In a further preferred embodiment, the constituents (A) and (B) are mixed together with a surface treatment agent with heating in a suitable mixing apparatus until homogeneous. This intermediate is then intimately mixed with the constituent (C) with addition of the constituent (E) and, if appropriate, optional constituents (F)-(H) in a second step in a kneader until homogeneous. Once again, the temperature during the mixing procedure should be above 50° C., preferably above 75° C., particularly preferably above 85° C., for from 10 minutes to 5 hours, preferably from 15 minutes to one hour. This preproduct is subsequently finished as described above by addition of constituent (D) and optional constituents (F)-(H) on a roll mill. If the constituent (D) has a decomposition temperature which is above the temperature reached in the kneader, the constituent (D) can also be incorporated in the kneader, if appropriate after the kneader has been cooled to a suitable temperature after the heat treatment step.

In another preferred embodiment, constituent (A) together with constituent (C) with addition of (E) and, if appropriate, optional constituents (F)-(H) are firstly mixed with heating in a kneader until homogeneous. The temperature during the mixing procedure should be above 50° C., preferably above 75° C., more preferably above 85° C., for from 10 minutes to 5 hours, preferably from 15 minutes to one hour. This is the ATH containing preproduct 1. The constituents (A) and (B) are then mixed together with a surface treatment agent with heating in a suitable mixing apparatus until homogeneous. This is the preproduct 2. Preproduct 1 and preproduct 2 are subsequently mixed in the desired ratio on the roll mill and finished together with constituent (D) and, if appropriate, optional constituents (F)-(H) to give the finished composition.

Apart from the constituents (A) to (E), further constituents can optionally be incorporated into the composition in all preferred methods of preparation.

The silicone rubbers of the invention are obtained from the silicone rubber compositions of the invention by means of the above-described crosslinking processes, and are, owing to their excellent mechanical and electrical properties, particularly suitable for the production of high-voltage insulators and cable sheathing.

EXAMPLES

Preparation of Base Mixture 1:

In a kneader, 100 parts of a dimethylvinylsilyloxy-terminated dimethylsiloxane-methylvinylsiloxane copolymer which comprises 99.94 mol % of dimethylsiloxy units and 0.06 mol % of methylvinylsiloxy units and has a degree of polymerization of about 6000 siloxy units are mixed with 31 parts of a vinylsilane-treated silica having a surface area, measured by the BET method, of 300 $m^2/g$, until homogeneous.

Preparation of Base Mixture 2:

In a kneader, 100 parts of a dimethylvinylsilyloxy-terminated dimethylsiloxane-methylvinylsiloxane copolymer which comprises 99.94 mol % of dimethylsiloxy units and 0.06 mol % of methylvinylsiloxy units and has a degree of polymerization of about 6000 siloxy units are mixed with 31 parts of silica having a surface area, measured by the BET method, of 300 $m^2/g$, and 7 parts of a dimethylhydroxysiloxy-terminated dimethylsiloxane oligomer having a viscosity of 40 mPa·s until homogeneous, and the mixture is heated at 170° C. for two hours.

Preparation of base Mixture 3:

In a kneader, 100 parts of a dimethylvinylsilyloxy-terminated dimethylsiloxane-methylvinylsiloxane copolymer which comprises 99.94 mol % of dimethylsiloxy units and 0.06 mol % of methylvinylsiloxy units and has a degree of polymerization of about 6000 siloxy units are mixed with 31 parts of silica having a surface area, measured by the BET method, of 300 $m^2/g$, 5 parts of a dimethylhydroxysiloxy-terminated dimethylsiloxane oligomer having a viscosity of 40 mPa·s and 5 parts of a dimethylhydroxysiloxy-terminated dimethylsiloxane-methylvinylsiloxane copolymer oligomer having a viscosity of 40 mPa·s and a methylvinylsiloxy content of 10 mol % until homogeneous, and the mixture is heated at 170° C. for two hours.

Crosslinker 1:
Crosslinker 1 is dicumyl peroxide.

Crosslinker 2:
Crosslinker 2 is a 50% strength paste of 2,5-dimethyl-2,5-bis(t-butylperoxy)hexane in silicone oil.

Crosslinker 3:
Crosslinker 3 is a trimethylsilyloxy-terminated dimethylsiloxy-methylhydrogensiloxy copolymer, having a mean chain length of 150 siloxy units, an Si—H content of 0.5% by weight and a viscosity of 360 $mm^2/s$ at 25° C.

Catalyst 1:
Catalyst 1 is a solution of a 1,3-divinyl-1,1,3,3-tetramethyldisiloxane-platinum complex in a dimethylvinylsilyloxy-terminated polydimethylsiloxane which has a platinum content of 0.025% by weight.

Catalyst 2:

Catalyst 2 is a solution of 1,5-cyclooctadienebis[tri-methylsilylphenylethynyl]platinum in a dimethylvinylsilyloxy-terminated polydimethylsiloxane which has a platinum content of 0.025% by weight.

Additive 1:

100 parts of a dimethylvinylsilyloxy-terminated dimethylsiloxane-methylvinylsiloxane copolymer which contains 20 mol % of methylvinylsiloxy units and has a viscosity at 25° C. of 50,000 mPa·s are homogeneously mixed in a stirred vessel with 50 parts of titanium dioxide which has been produced pyrogenically in the gas phase. 25 parts of a mixture of a platinum-vinylsiloxane complex (known as Karstedt catalyst) in a dimethylvinylsilyloxy-terminated dimethylpolysiloxane having a viscosity at 25° C. of 1400 mPa·s which has a platinum content (calculated as element) of 1% by weight are added thereto and the mixture is mixed until homogeneous. 4 parts of N-(2-aminoethyl)-3-aminopropyltrimethoxysilane are added to this mixture, the mixture is heated slowly to 150° C. while stirring vigorously, and is stirred at 150° C. for 2 hours.

Additive 2:

Additive 2 is a 50% strength by weight mixture of a cobalt-aluminum oxide spinel obtainable under the trade name Sicopal blau K 6310 (BASF AG, Ludwigshafen/Germany) in base mixture 1.

Additive 3:

Additive 3 is a dimethylsiloxane-methylvinylsiloxane copolymer oligomer which has an average chain length of 12 siloxy units and a methylvinylsiloxy content of 8 mol % and bears 3-methyl-3-hydroxybut-1-yn-4-oxy groups at the ends of the chain.

Example 1

In a kneader, 100 parts of base mixture 2 are mixed with 1.4 parts of ammonium carbamate and 145 parts of untreated aluminum hydroxide (Micral® 632; J. M. Huber Corporation, Edison N.J./U.S.A.) with heating until homogeneous in such a way that the composition in the kneader is at a temperature of 100° C. for at least 30 minutes. 100 parts of this mixture are finished with 1.0 part of crosslinker 2 on a roll mill. To produce test specimens, the composition is pressed at 170° C. for 15 minutes and subsequently heat treated at 150° C. for 4 hours.

Example 2

In a kneader, 100 parts of base mixture 3 are mixed with 1.4 parts of ammonium carbamate and 140 parts of untreated aluminum hydroxide (Micral® 632; J. M. Huber Corporation, Edison N.J./U.S.A.) with heating until homogeneous in such a way that the composition in the kneader is at a temperature of 100° C. for at least 30 minutes. 100 parts of this mixture are finished with 1.0 part of crosslinker 2 on a roll mill. To produce test specimens, the composition is pressed at 170° C. for 15 minutes and subsequently heat treated at 150° C. for 4 hours.

Example 3

In a kneader, 100 parts of base mixture 2 are mixed with 1.4 parts of ammonium carbamate and 130 parts of untreated aluminum hydroxide (Micral® 632; J. M. Huber Corporation, Edison N.J./U.S.A.) with heating until homogeneous in such a way that the composition in the kneader is at a temperature of 100° C. for at least 30 minutes. 100 parts of this mixture are finished with 0.03 part of ethynylcyclohexanol as inhibitor, 3 parts of crosslinker 3 and 1 part of catalyst 1 on a roll mill. To produce test specimens, the composition is pressed at 170° C. for 15 minutes.

Example 4

In a kneader, 100 parts of base mixture 2 are mixed with 1.5 parts of ammonium carbamate, 140 parts of untreated aluminum hydroxide (Micral® 632; J. M. Huber Corporation, Edison N.J./U.S.A.) and 20 parts of a dimethylvinylsilyloxy-terminated dimethylsiloxane-methylvinylsiloxane copolymer which comprises 99.55 mol % of dimethylsiloxy units and 0.45 mol % of methylvinylsiloxy units and has a degree of polymerization of about 5500 siloxy units with heating until homogeneous in such a way that the composition in the kneader is at a temperature of 100° C. for at least 30 minutes. 100 parts of this mixture are finished with 0.03 part of ethynylcyclohexanol as inhibitor, 3 parts of crosslinker 3 and 1 part of catalyst 1 on a roll mill. To produce test specimens, the composition is pressed at 170° C. for 15 minutes.

Example 5

(Not according to the Invention)

In a kneader, 100 parts of base mixture 2 are mixed with 130 parts of untreated aluminum hydroxide (Micral® 632; J. M. Huber Corporation, Edison N.J./U.S.A.) until homogeneous. 100 parts of this mixture are finished with 0.03 part of ethynylcyclohexanol as inhibitor, 3 parts of crosslinker 3 and 1 part of catalyst 1 on a roll mill. To produce test specimens, the composition is pressed at 170° C. for 15 minutes.

Example 6

In a kneader, 100 parts of base mixture 2 are mixed with 1.25 parts of ammonium carbamate, 125 parts of untreated aluminum hydroxide (Martinal OL 104; Martinswerk GmbH, Bergheim/Germany), 2.5 parts of a dimethylhydroxysiloxy-terminated dimethylsiloxane oligomer having a viscosity of 40 mPa·s and 1.0 part of calcium stearate as processing aid with heating until homogeneous in such a way that the composition in the kneader is at a temperature of 100° C. for at least 30 minutes. 100 parts of this mixture are finished with 0.025 part of ethynylcyclohexanol as inhibitor, 3 parts of crosslinker 3, 0.7 part of additive 1 and 1 part of catalyst 2 on a roll mill. To produce test specimens, the composition is pressed at 170° C. for 15 minutes.

Example 7

In a kneader, 100 parts of base mixture 2 are mixed with 2.5 parts of ammonium carbamate, 150 parts of untreated aluminum hydroxide (Micral® 632; J. M. Huber Corporation, Edison N.J./U.S.A.), 20 parts of a dimethylvinylsilyloxy-terminated dimethylsiloxane-methylvinylsiloxane copolymer which comprises 99.55 mol % of dimethylsiloxy units and 0.45 mol % of methylvinylsiloxy units and has a degree of polymerization of about 5500 siloxy units and 1 part of calcium stearate as processing aid with heating until homogeneous in such a way that the composition in the kneader is at a temperature of 120° C. for at least 30 minutes.

100 parts of this mixture are finished with 0.025 part of ethynylcyclohexanol as inhibitor, 3 parts of crosslinker 3, 0.7 part of additive 1 and 1 part of catalyst 2 on a roll mill. To produce test specimens, the composition is pressed at 170° C. for 15 minutes.

Example 8

In a kneader, 100 parts of base mixture 2 are mixed with 2.5 parts of ammonium carbamate, 150 parts of untreated aluminum hydroxide (Martinal OL 104; Martinswerk GmbH, Bergheim/Germany), 20 parts of a dimethylvinylsilyloxy-terminated dimethylsiloxane-methylvinylsiloxane copolymer which comprises 99.55 mol % of dimethylsiloxy units and 0.45 mol % of methylvinylsiloxy units and has a degree of polymerization of about 5500 siloxy units, 2.5 parts of a dimethylhydroxysiloxy-terminated dimethylsiloxane-methylvinylsiloxane copolymer oligomer having a viscosity of 40 mPa·s and a methylvinylsiloxy content of 10 mol % and 1 part of calcium stearate as processing aid with heating until homogeneous in such a way that the composition in the kneader is at a temperature of 120° C. for at least 30 minutes. 100 parts of this mixture are finished with 0.025 part of ethynylcyclohexanol as inhibitor, 3 parts of crosslinker 3, 0.7 part of additive 1 and 1 part of catalyst 2 on a roll mill. To produce test specimens, the composition is pressed at 170° C. for 15 minutes.

Example 9

(Not According to the Invention)

In a kneader, 100 parts of base mixture 2, 150 parts of untreated aluminum hydroxide (Martinal OL 104; Martinswerk GmbH, Bergheim/Germany), 20 parts of a dimethylvinylsilyloxy-terminated dimethylsiloxane-methylvinylsiloxane copolymer which comprises 99.55 mol % of dimethylsiloxy units and 0.45 mol % of methylvinylsiloxy units and has a degree of polymerization of about 5500 siloxy units, 2.5 parts of a dimethylhydroxysiloxy-terminated dimethylsiloxane-methylvinylsiloxane copolymer oligomer having a viscosity of 40 mPa·s and a methylvinylsiloxy content of 10 mol % and 1 part of calcium stearate as processing aid are mixed until homogeneous. 100 parts of this mixture are finished with 0.025 part of ethynylcyclohexanol as inhibitor, 3 parts of crosslinker 3, 0.7 part of additive 1 and 1 part of catalyst 2 on a roll mill. To produce test specimens, the composition is pressed at 170° C. for 15 minutes.

Example 10

In a kneader, 100 parts of base mixture 2 are mixed with 2.5 parts of ammonium carbamate, 150 parts of untreated aluminum hydroxide (Martinal OL 104; Martinswerk GmbH, Bergheim/Germany), 20 parts of a dimethylvinylsilyloxy-terminated dimethylsiloxane-methylvinylsiloxane copolymer which comprises 99.55 mol % of dimethylsiloxy units and 0.45 mol % of methylvinylsiloxy units and has a degree of polymerization of about 5500 siloxy units, 2.5 parts of a dimethylhydroxysiloxy-terminated dimethylsiloxane-methylvinylsiloxane copolymer oligomer having a viscosity of 40 mPa·s and a methylvinylsiloxy content of 10 mol % and 1 part of calcium stearate as processing aid with heating until homogeneous in such a way that the composition in the kneader is at a temperature of 120° C. for at least 30 minutes. 100 parts of this mixture are finished with 3 parts of crosslinker 3, 0.7 part of additive 1 and 1 part of catalyst 2 on a roll mill. No inhibitor is added. To produce test specimens, the composition is pressed at 170° C. for 15 minutes.

Example 11

In a kneader, 100 parts of base mixture 2 are mixed with 4.0 parts of ammonium carbamate, 150 parts of untreated aluminum hydroxide (Martinal OL 104; Martinswerk GmbH, Bergheim/Germany), 20 parts of a dimethylvinylsilyloxy-terminated dimethylsiloxane-methylvinylsiloxane copolymer which comprises 99.55 mol % of dimethylsiloxy units and 0.45 mol % of methylvinylsiloxy units and has a degree of polymerization of about 5500 siloxy units, 2.5 parts of a dimethylhydroxysiloxy-terminated dimethylsiloxane-methylvinylsiloxane copolymer oligomer having a viscosity of 40 mPa·s and a methylvinylsiloxy content of 10 mol % and 1 part of calcium stearate as processing aid with heating until homogeneous in such a way that the composition in the kneader is at a temperature of 120° C. for at least 30 minutes. 100 parts of this mixture are finished with 0.01 part of ethynylcyclohexanol as inhibitor, 3 parts of crosslinker 3, 0.7 part of additive 1 and 1 part of catalyst 2 on a roll mill. To produce test specimens, the composition is pressed at 170° C. for 15 minutes.

Example 12

Example 12 was carried out as described in example 8, except that the temperature in the kneader during homogenization was maintained at 90° C. for at least 30 minutes.

Example 13

(Not According to the Invention)

Example 13 was carried out as described in example 8, except that the temperature in the kneader during homogenization did not exceed 60° C.

Example 14

Example 14 is identical to example 12, but the uncrosslinked composition was stored at room temperature for three months before production of the test specimens and measurement of the mechanical properties.

Example 15

In a kneader, 100 parts of base mixture 2 are mixed with 2.0 parts of ammonium carbamate, 145 parts of treated aluminum hydroxide (Martinal OL 104/S; Martinswerk GmbH, Bergheim/Germany), 18 parts of a dimethylvinylsilyloxy-terminated dimethylsiloxane-methylvinylsiloxane copolymer which comprises 99.55 mol % of dimethylsiloxy units and 0.45 mol % of methylvinylsiloxy units and has a degree of polymerization of about 5500 siloxy units, 2.5 parts of a dimethylhydroxysiloxy-terminated dimethylsiloxane-methylvinylsiloxane-copolymer oligomer having a viscosity of 40 mPa·s and a methylvinylsiloxy content of 10 mol % and 1 part of calcium stearate as processing aid with heating until homogeneous in such a way that the composition in the kneader is at a temperature of 90° C. for at least 30 minutes. 100 parts of this mixture are finished with 0.025 part of ethynylcyclohexanol as inhibitor, 3 parts of crosslinker 3, 0.5 part of additive 1 and 1 part of catalyst 2 on a roll mill. To produce test specimens, the composition is pressed at 170° C. for 15 minutes.

Example 16

(Not According to the Invention)

In a kneader, 100 parts of base mixture 2 are mixed with 145 parts of treated aluminum hydroxide (Martinal OL 104/S; Martinswerk GmbH, Bergheim/Germany), 18 parts of a dimethylvinylsilyloxy-terminated dimethylsiloxane-methylvinylsiloxane copolymer which comprises 99.55 mol % of dimethylsiloxy units and 0.45 mol % of methylvinylsiloxy units and has a degree of polymerization of about 5500 siloxy units, 2.5 parts of a dimethylhydroxysiloxy-terminated dimethylsiloxane-methylvinylsiloxane copolymer oligomer having a viscosity of 40 mPa·s and a methylvinylsiloxy content of 10 mol % and 1 part of calcium stearate as processing aid until homogeneous. 100 parts of this mixture are finished with 0.025 part of ethynylcyclohexanol as inhibitor, 3 parts of crosslinker 3, 0.5 part of additive 1 and 1 part of catalyst 2 on a roll mill. To produce test specimens, the composition is pressed at 170° C. for 15 minutes.

Example 17

In a kneader, 100 parts of base mixture 1 are mixed with 3.0 parts of ammonium carbonate, 145 parts of untreated aluminum hydroxide (Apyral 40 CD; Nabaltec GmbH, Schwandorf/Germany), 16 parts of a dimethylvinylsilyloxy-terminated dimethylsiloxane-methylvinylsiloxane copolymer which comprises 99.55 mol % of dimethylsiloxy units and 0.45 mol % of methylvinylsiloxy units and has a degree of polymerization of about 5500 siloxy units, 1.5 parts of calcium stearate as processing aid and 2.2 parts of additive 2 with heating until homogeneous in such a way that the composition in the kneader is at a temperature of 110° C. for at least 45 minutes. 100 parts of this mixture are finished with 0.025 part of ethynylcyclohexanol as inhibitor, 0.8 part of additive 1, 3 parts of crosslinker 3 and 1 part of catalyst 2 on a roll mill. To produce test specimens, the composition is pressed at 170° C. for 15 minutes.

Example 18

In a kneader, 100 parts of base mixture 1 are mixed with 3.5 parts of ammonium hydrogencarbonate, 145 parts of untreated aluminum hydroxide (Apyral 40 CD; Nabaltec GmbH, Schwandorf/Germany), 16 parts of a dimethylvinylsilyloxy-terminated dimethylsiloxane-methylvinylsiloxane copolymer which comprises 99.55 mol % of dimethylsiloxy units and 0.45 mol % of methylvinylsiloxy units and has a degree of polymerization of about 5500 siloxy units, 1.5 parts of calcium stearate as processing aid and 2.2 parts of additive 2 with heating until homogeneous in such a way that the composition in the kneader is at a temperature of 110° C. for at least 30 minutes. 100 parts of this mixture are finished with 0.025 part of ethynylcyclohexanol as inhibitor, 0.8 part of additive 1, 3 parts of crosslinker 3 and 1 part of catalyst 2 on a roll mill. To produce test specimens, the composition is pressed at 170° C. for 15 minutes.

Example 19

In a kneader, 100 parts of base mixture 1 are mixed with 2.5 parts of acetic acid, 145 parts of untreated aluminum hydroxide (Apyral 40 CD; Nabaltec GmbH, Schwandorf/Germany), 18 parts of a dimethylvinylsilyloxy-terminated dimethylsiloxane-methylvinylsiloxane copolymer which comprises 99.55 mol % of dimethylsiloxy units and 0.45 mol % of methylvinylsiloxy units and has a degree of polymerization of about 5500 siloxy units, 1.5 parts of calcium stearate as processing aid and 2.2 parts of additive 2 with heating until homogeneous in such a way that the composition in the kneader is at a temperature of 120° C. for at least 30 minutes. 100 parts of this mixture are finished with 0.045 part of ethynylcyciohexanol as inhibitor, 0.8 part of additive 1,3 parts of crosslinker 3 and 1 part of catalyst 2 on a roll mill. To produce test specimens, the composition is pressed at 170° C. for 15 minutes.

Example 20

In a kneader, 100 parts of base mixture 1 are mixed with 3.5 parts of ammonium hydrogencarbonate, 145 parts of untreated aluminum hydroxide (Apyral 40 CD; Nabaltec GmbH, Schwandorf/Germany), 16 parts of a dimethylvinylsilyloxy-terminated dimethylsiloxane-methylvinylsiloxane copolymer which comprises 99.55 mol % of dimethylsiloxy units and 0.45 mol % of methylvinylsiloxy units and has a degree of polymerization of about 5500 siloxy units, 1.5 parts of calcium stearate as processing aid and 2.2 parts of additive 2 with heating until homogeneous in such a way that the composition in the kneader is at a temperature of 110° C. for at least 30 minutes. 100 parts of this mixture are finished with 0.8 part of additive 1,3 parts of crosslinker 3 and 1 part of catalyst 2 on a roll mill. No inhibitor is added. To produce test specimens, the composition is pressed at 170° C. for 15 minutes.

Example 21

In a kneader, 100 parts of base mixture 3 are mixed with 1.5 parts of ammonium carbamate, 145 parts of untreated aluminum hydroxide (Micral 623; J. M. Huber Corporation, Edison N.J./U.S.A.), 20 parts of a dimethylvinylsilyloxy-terminated dimethylsiloxane-methylvinylsiloxane copolymer which comprises 99.55 mol % of dimethylsiloxy units and 0.45 mol % of methylvinylsiloxy units and has a degree of polymerization of about 5500 siloxy units with heating until homogeneous in such a way that the composition in the kneader is at a temperature of 90° C. for at least 30 minutes. 100 parts of this mixture are finished with 1 part of additive 1,2 parts of additive 3, 3 parts of crosslinker 3 and 1 part of catalyst 2 on a roll mill. To produce test specimens, the composition is pressed at 170° C. for 15 minutes.

Example 22

In a kneader, 100 parts of base mixture 3 are mixed with 2.0 parts of ammonium carbamate, 145 parts of untreated aluminum hydroxide (Martinal OL 104; Martinswerk GmbH, Bergheim/Germany), 10 parts of a dimethylvinylsilyloxy-terminated dimethylsiloxane-methylvinylsiloxane copolymer which comprises 99.55 mol % of dimethylsiloxy units and 0.45 mol % of methylvinylsiloxy units and has a degree of polymerization of about 5500 siloxy units, 10 parts of a dimethylvinylsilyloxy-terminated dimethylsiloxane-methylvinylsiloxane copolymer which comprises 99.94 mol % of dimethylsiloxy units and 0.06 mol % of methylvinylsiloxy units and has a degree of polymerization of about 6000 siloxy units, 2.8 parts of a dimethylhydroxysiloxy-terminated dimethylsiloxane-methylvinylsiloxane copolymer oligomer having a viscosity of 40 mPa·s and a methylvinylsiloxy content of 10 mol % and 2.0 parts of calcium stearate as processing aid with heating until homogeneous in such a way that the composition in the kneader is at a temperature of 90° C. for at least 30 minutes. 100 parts of this mixture are finished with 0.025 part of ethynylcyclohexanol as inhibitor, 0.8 part of additive 1,3 parts of crosslinker 3 and 1 part of catalyst 2 on a roll mill. To produce test specimens, the composition is pressed at 170° C. for 15 minutes.

Example 23

In a kneader, 100 parts of base mixture 3 are mixed with 2.0 parts of ammonium carbamate, 150 parts of untreated aluminum hydroxide (Martinal OL 104; Martinswerk GmbH, Bergheim/Germany), 18 parts of a dimethylvinylsilyloxy-terminated dimethylsiloxane-methylvinylsiloxane copolymer which comprises 99.94 mol % of dimethylsiloxy units and 0.06 mol % of methylvinylsiloxy units and has a degree of polymerization of about 6000 siloxy units, 3.0 parts of a dimethylhydroxysiloxy-terminated dimethylsiloxane-methylvinylsiloxane copolymer oligomer having a viscosity of 40 mPa·s and a methylvinylsiloxy content of 10 mol % and 2.0 parts of calcium stearate as processing aid with heating until homogeneous in such a way that the composition in the kneader is at a temperature of 90° C. for at least 30 minutes. 100 parts of this mixture are finished with 0.025 part of ethynylcyclohexanol as inhibitor, 0.8 part of additive 1, 3 parts of crosslinker 3 and 1 part of catalyst 2 on a roll mill. To produce test specimens, the composition is pressed at 170° C. for 15 minutes.

Example 24

In a kneader, 100 parts of base mixture 3 are mixed with 2.0 parts of ammonium carbamate, 130 parts of untreated aluminum hydroxide (Apyral 40 CD; Nabaltec GmbH, Schwandorf/Germany), 1.5 parts of titanium dioxide, 20 parts of a dimethylvinylsilyloxy-terminated dimethylsiloxane-methylvinylsiloxane copolymer which comprises 99.55 mol % of dimethylsiloxy units and 0.45 mol % of methylvinylsiloxy units and has a degree of polymerization of about 5500 siloxy units and 2.0 parts of calcium stearate as processing aid with heating until homogeneous in such a way that the composition in the kneader is at a temperature of 90° C. for at least 30 minutes. 100 parts of this mixture are finished with 0.025 part of ethynylcyclohexanol as inhibitor, 2.5 parts of crosslinker 3 and 1 part of catalyst 2 on a roll mill. To produce test specimens, the composition is pressed at 170° C. for 15 minutes.

Preparation of Base Mixture 4:

In a kneader, 100 parts of a dimethylvinylsilyloxy-terminated dimethylsiloxane-methylvinylsiloxane copolymer which comprises 99.55 mol % of dimethylsiloxy units and 0.45 mol % of methylvinylsiloxy units and has a degree of polymerization of about 5500 siloxy units are mixed with 4 parts of a dimethylhydroxysiloxy-terminated dimethylsiloxane-methylvinylsiloxane copolymer oligomer having a viscosity of 40 mPa·s and a methylvinylsiloxy content of 10 mol %, 4 parts of ammonium carbamate and 290 parts of untreated aluminum hydroxide (Martinal OL 104; Martinswerk GmbH, Bergheim/Germany) with heating until homogeneous in such a way that the composition in the kneader is at a temperature of 100° C. for at least 30 minutes.

Example 25

100 parts of base mixture 4 are homogenized with 45 parts of base mixture 3 on the roll mill. 100 parts of the mixture prepared in this way are finished with 0.05 part of ethynylcyclohexanol as inhibitor, 3 parts of crosslinker 3 and 1 part of catalyst 1, once again on the roll mill. To produce test specimens, the composition is pressed at 170° C. for 15 minutes.

Example 26

100 parts of base mixture 4 are homogenized with 45 parts of base mixture 3 on the roll mill. 100 parts of the mixture prepared in this way are finished with 0.05 part of ethynylcyclohexanol as inhibitor, 3 parts of crosslinker 3 and 1 part of catalyst 2, once again on the roll mill. To produce test specimens, the composition is pressed at 170° C. for 15 minutes.

The measurement results for the abovementioned examples are summarized in Tables 1a and 1b. The measurement of the Shore hardnesses was carried out in accordance with DIN 53505-A on 6 mm thick test specimens. The measurement of the ultimate tensile strengths and elongations at break was carried out in accordance with DIN 53504 on 2 mm thick Si tensile bars. The measurement of the tear propagation resistances was carried out in accordance with ASTM D 624 B on 2 mm thick test specimens. The measurement of the reaction start temperatures was carried out nonisothermally in accordance with DIN 53529-A3 and the measurement of the T 50 values was carried out isothermally at 150° C. in accordance with DIN 53529-A3.

TABLE 1a

| Example | Hardness [Shore A] | Ultimate tensile strength [N/mm$^2$] | Elongation at break [%] | Tear propagation resistance [N/mm] | Pot life at RT [d] | Pot life at 50° C. [d] | Reaction start temperature [° C.] | T 50 [s] |
|---|---|---|---|---|---|---|---|---|
| 1 | 79 | 3.0 | 505 | 16.8 | — | — | — | — |
| 2 | 77 | 3.6 | 571 | 17.5 | — | — | — | — |
| 3 | 75 | 3.0 | 512 | 13.9 | — | — | — | — |
| 4 | 77 | 3.3 | 335 | 16.8 | — | — | — | — |
| 5* | 76 | 2.9 | 423 | 12.9 | <3 | <1 | 108 | 14 |
| 6 | 73 | 3.1 | 451 | 16.4 | >180 | 45 | 138 | 31 |
| 7 | 79 | 3.6 | 223 | 16.6 | >180 | 17 | — | — |
| 8 | 77 | 3.5 | 261 | 14.9 | >180 | 19 | 132 | 32 |
| 9* | 77 | 3.3 | 249 | 13.9 | 25 | 1 | 117 | 19 |
| 10 | 79 | 4.1 | 267 | 14.6 | 55 | 4 | 116 | 36 |
| 11 | 78 | 3.4 | 230 | 14.0 | 170 | 8 | 127 | 30 |
| 12 | 77 | 3.7 | 256 | 14.5 | >180 | 22 | 133 | 36 |
| 13* | 74 | 2.4 | 77 | 12.4 | >180 | 18 | 144 | 54 |

*not according to the invention

TABLE 1b

| Example | Hardness [Shore A] | Ultimate tensile strength [N/mm$^2$] | Elongation at break [%] | Tear propagation resistance [N/mm] | Pot life at RT [d] | Pot life at 50° C. [d] | Reaction start temperature [° C.] | T 50 [s] |
|---|---|---|---|---|---|---|---|---|
| 14 | 76 | 3.9 | 276 | 14.2 | — | — | 132 | 30 |
| 15 | 73 | 4.4 | 286 | 15.6 | >180 | 22 | 133 | 51 |
| 16* | 74 | 4.0 | 216 | 15.2 | 27 | 2 | 117 | 27 |
| 17 | 69 | 2.9 | 253 | 16.7 | >180 | 39 | 134 | 43 |
| 18 | 74 | 3.3 | 223 | 16.4 | >180 | 13 | 126 | 27 |
| 19 | 72 | 3.0 | 245 | 13.7 | 140 | 7 | 121 | 23 |
| 20 | 73 | 3.5 | 253 | 14.3 | 51 | 4 | 114 | 28 |
| 21 | 76 | 4.0 | 289 | 15.9 | >180 | 44 | 134 | 29 |
| 22 | 73 | 3.6 | 386 | 17.9 | >180 | 38 | 130 | 35 |
| 23 | 76 | 4.0 | 324 | 15.8 | >180 | 33 | 131 | 28 |
| 24 | 78 | 3.8 | 306 | 16.9 | >180 | 29 | 130 | 28 |
| 25 | 70 | 3.4 | 320 | 16.4 | 45 | 12 | — | — |
| 26 | 73 | 3.5 | 286 | 15.9 | >180 | 69 | — | — |

*not according to the invention

The measurement results from the electrical testing of a few selected examples for among those mentioned above are summarized in Table 2. The testing of the dielectric strength was carried out in accordance with DIN IEC 243-2 and the testing of the specific volume resistance was carried out in accordance with DIN IEC 93. The testing of the high-voltage arcing resistance was carried out in accordance with DIN VDE 0441 Part 1 and the testing of the high-voltage leakage current resistance was carried out in accordance with DIN IEC 587 (VDE 0303 Part 10).

| Example | Dielectric strength [kV/mm] | Specific volume resistance [Ω · cm] | High-voltage arcing resistance [s] | High-voltage leakage current resistance |
|---|---|---|---|---|
| 2 | 22 | 8.13 · 10$^{14}$ | 339 | 1 A 4.5 |
| 8 | 22 | 1.30 · 10$^{15}$ | 320 | 1 A 4.5 |
| 15 | 21 | 1.15 · 10$^{15}$ | 312 | 1 A 4.5 |
| 18 | 22 | 1.02 · 10$^{15}$ | 315 | 1 A 4.5 |

The measurement results from electrical testing after boiling of some selected examples from those mentioned above are summarized in Table 3. The tests were carried out in accordance with the abovementioned standards. The specimens after boiling were stored in deionized water with an addition of 0.1% of sodium chloride for 100 hours beforehand and had a sample thickness of 3 mm.

| Example | Dielectric strength [kV/mm] before boiling | Dielectric strength [kV/mm] after boiling | Dielectric constant ε before boiling | Dielectric constant ε after boiling | Loss factor tan δ before boiling | Loss factor tan δ after boiling |
|---|---|---|---|---|---|---|
| 2 | 12.4 | 11.9 | 3.6 | 4.7 | 0.006 | 0.075 |
| 8 | 13.4 | 12.6 | 3.7 | 4.6 | 0.006 | 0.083 |
| 15 | 13.3 | 12.3 | 3.7 | 4.3 | 0.006 | 0.079 |
| 18 | 13.1 | 12.7 | 3.7 | 4.7 | 0.006 | 0.082 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. In the claims, the replacement groups for all R substituents ($R^1$, $R^2$, etc.) may be selected independently.

What is claimed is:

1. A silicone rubber composition comprising
   (A) 100 parts by weight of at least one diorganopolysiloxane comprising units of the formula (1)

$$R^1{}_a R^2{}_b SiO_{(4-a-b)/2} \tag{1}$$

where
   $R^1$ is an unsubstituted or halogen-substituted monovalent hydrocarbon radical which has from 1 to 20 carbon atoms and is free of aliphatic unsaturated groups,
   $R^2$ is an unsubstituted or halogen-substituted monovalent hydrocarbon radical which contains at least one aliphatic carbon-carbon multiple bond, and
   a, b are each a positive number, with the proviso that $1 \leq a < 3$, $0 < b \leq 1$ and $1 < a+b \leq 3$, with each molecule having on average at least two monovalent hydrocarbon radicals containing aliphatic carbon-carbon multiple bonds of this type bound to silicon atoms,
   (B) from 1 to 100 parts by weight, based on 100 parts by weight of (A), of finely divided silica having a specific surface area, measured by the BET method, of 50-300 m$^2$/g,
   (C) 50-300 parts by weight, based on 100 parts by weight of (A), of at least one aluminum hydroxide powder having a specific surface area, measured by the BET method, of 0.1-20 m$^2$/g and an average particle size of 0.05-20 μm,
   (D) crosslinkers in an amount sufficient to cure the composition, with this crosslinker being selected from the group consisting of
   (D1) an organic peroxide, hydroperoxide or a mixture of various organic peroxides or hydroperoxides, and
   (D2) a combination of an organohydrogenpolysiloxane comprising units of the formula (2)

$$R^3{}_c H_d SiO_{(4-c-d)/2} \tag{2}$$

where
   $R^3$ is a substituted or unsubstituted monovalent hydrocarbon radical which is not aliphatically unsaturated, and
   c, d are each a positive number, with the proviso that $1 \leq c < 3$, $0 < d \leq 1$ and $1 < c+d \leq 3$ and each molecule has on average at least three such hydrogen atoms bound to silicon atoms, and a hydrosilylation catalyst comprising at least one transition metal, and (E) 0.01-10.0 parts by weight, based on 100 parts by weight of (A), of at least one of an inorganic base, inorganic acid, organic acid, organosilicon acid or a compound which liberates an inorganic base, inorganic acid, or organic or organosilicon base or acid on heating, an organic amine, aniline, dimethylalinine, toluidine, pyridine, and their alkyl-substituted derivatives, urea, N-alkylurea derivative, N-triorganylsilyl-carbamic ester, N-triorganylsilyl-carbamate, or N-triorganylsilylurea.

2. The silicone rubber composition of claim 1, wherein the base (E) is selected from the group consisting of alkali metal hydroxides and alkaline earth metal hydroxides, ammonium hydroxide, organic primary, secondary and tertiary aliphatic and cycloaliphatic amines, ammonia, salts of organic amines and ammonium compounds.

3. The silicone rubber composition of claim 1, wherein the base (E) is ammonium carbonate, ammonium hydrogencarbonate, ammonium acetate, or ammonium carbamate.

4. The silicone rubber composition of claim 1, wherein an acid (E) is selected from the group consisting of sulfonic acids, mineral acids, monocarboxylic acids, dicarboxylic acids and hydroxycarboxylic acids.

5. The silicone rubber composition of claim 1, which contains at least 10 ppm and not more than 1000 ppm of nitrogen.

6. The silicone rubber composition of claim 1, wherein (D) is a combination of an organohydrogenpolysiloxane comprising units of the formula (2):

$$R_c^3 H_d SiO_{(4-c-d)/2} \qquad (2),$$

where $R^3$ is a substituted or unsubstituted monovalent hydrocarbon radical which is not aliphatically unsaturated, c, d are each a positive number, with the proviso that $1 \leq c < 3$, $0 < d \leq 1$ and $1 < c+d \leq 3$, and each molecule has on average at least three such hydrogen atoms bound to silicon atoms, and a hydrosilylation catalyst comprising at least one transition metal.

7. The silicone rubber composition of claim 6, wherein the hydrosilylation catalyst is selected from the group consisting of compounds of the formula (5)

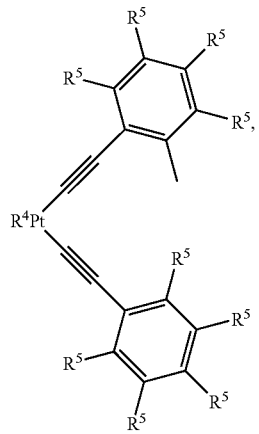

and oligomeric or polymeric compounds which comprise structural units of the formula (6)

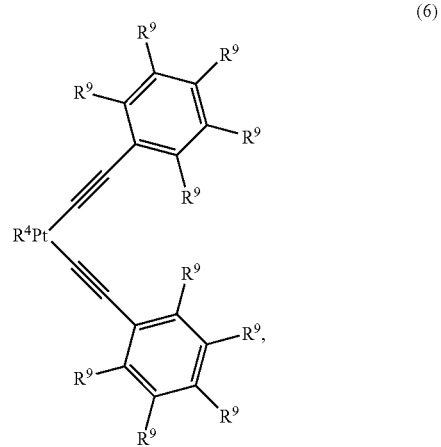

and optionally structural units of the formula (7)

$$R^{11}_r SiO_{(4-r)/2} \qquad (7)$$

where $R^4$ is a substituted or unsubstituted diene which is bound to platinum by means of at least one π bond and has an unbranched or branched chain having from 4 to 18 carbon atoms, or a ring having from 6 to 28 carbon atoms, the radicals $R^5$ are each a hydrogen atom, a halogen atom, $-SiR^6_3$, $-OR^8$ or a monovalent, substituted or unsubstituted hydrocarbon radical having from 1 to 24 carbon atoms, with the proviso that at least one radical $R^5$ in the compounds of the formula (5) is $-SiR^6_3$, the radicals $R^6$ are each hydrogen, a halogen atom, $-OR^8$ or a monovalent, substituted or unsubstituted hydrocarbon radical having from 1 to 24 carbon atoms, the radicals $R^8$ are each a hydrogen atom, $-SiR^6_3$ or a monovalent, substituted or unsubstituted hydrocarbon radical having from 1 to 20 carbon atoms, the radicals $R^9$ are each a hydrogen atom, a halogen atom, $-SiR^6_3$, $-SiR^6_{(3-t)}[R^{10}SiR^{11}_s O_{(3-s)/2}]_t$, $-OR^8$ or a monovalent substituted or unsubstituted hydrocarbon radical having from 1 to 24 carbon atoms, with the proviso that at least one radical $R^9$ in the formula (6) is $SiR^6_{(3-t)}[R^{10}SiR^{11}_s O_{(3-s)/2}]_t$, the radicals $R^{10}$ are each oxygen or a divalent, substituted or unsubstituted hydrocarbon radical which has from 1 to 24 carbon atoms and can be bound to the silicon via an oxygen atom, the radicals $R^{11}$ are each hydrogen or an organic radical, r is 0, 1, 2 or 3, s is 0, 1, 2 or 3, and t is 1, 2 or 3.

8. The silicone rubber composition of claim 7, wherein the hydrosilylation catalyst is selected from the group consisting of bis(alkynyl)(1,5-cyclooctadiene)platinum, bis(alkynyl) (bicyclo[2.2.1]hepta-2,5-diene)platinum, bis(alkynyl)(1,5-dimethyl-1,5-cyclooctadiene)platinum and bis(alkynyl)(1,6-dimethyl-1,5-cyclooctadiene)platinum complexes.

9. The silicone rubber composition of claim 1, which further comprises an inhibitor.

10. The silicone rubber composition of claim 1, wherein (D) is an organic peroxide, hydroperoxide or a mixture of various organic peroxides or hydroperoxides.

11. The silicone rubber composition of claim 1, wherein component (B) has been surface-treated with silicon compounds or hydroxy-terminated diorganosiloxane oligomers, with the proportion of these silicon compounds or hydroxy-terminated diorganosiloxane oligomers containing unsaturated groups being at least 10% based on the total weight of silicon compounds used to surface-treat component (B).

12. The silicone rubber composition of claim 1, which further comprises a metal oxide other than silica.

13. The silicone rubber composition of claim 1, which further comprises a platinum compound or a platinum complex or the reaction product of a platinum compound or a platinum complex with an organosilicon compound which has basic nitrogen bound to the silicon via carbon.

14. The silicone rubber composition of claim 1, which further comprises additional fillers other than silica and aluminum hydroxide.

15. A process for preparing the silicone rubber compositions of claim 1, comprising mixing the constituents in a mixing apparatus.

16. The process of claim 15, wherein the constituent (E) is mixed with the constituents (A), (B) and (C) and, optionally with further optional constituents in a suitable mixing apparatus and the preproduct is, after having been discharged from the mixing apparatus, finished by addition of constituent (D) on a roll mill.

17. The process of claim 15, wherein the temperature during the mixing-in of constituent (E) is above 50° C. for at least 10 minutes.

18. A silicone rubber prepared by crosslinking a silicone rubber composition of claim 1.

19. A process for preparing a crosslinked silicone rubber comprising crosslinking a silicone rubber composition of claim 1.

20. A high-voltage insulator or cable sheath comprising a crosslinked silicone rubber as claimed in claim 1, said silicone rubber having a low combustibility.

21. A silicone rubber composition comprising
(A) 100 parts by weight of at least one diorganopolysiloxane comprising units of the formula (1)

$$R^1_a R^2_b SiO_{(4-a-b)/2} \qquad (1)$$

where
$R^1$ is an unsubstituted or halogen-substituted monovalent hydrocarbon radical which has from 1 to 20 carbon atoms and is free of aliphatic unsaturated groups,
$R^2$ is an unsubstituted or halogen-substituted monovalent hydrocarbon radical which contains at least one aliphatic carbon-carbon multiple bond, and
a, b are each a positive number, with the proviso that $1 \leq a < 3$, $0 < b \leq 1$ and $1 < a+b \leq 3$, with each molecule having on average at least two monovalent hydrocarbon radicals containing aliphatic carbon-carbon multiple bonds of this type bound to silicon atoms,
(B) from 1 to 100 parts by weight, based on 100 parts by weight of (A), of finely divided silica having a specific surface area, measured by the BET method, of 50-300m²/g,
(C) 50-300 parts by weight, based on 100 parts by weight of (A), of at least one aluminum hydroxide powder having a specific surface area, measured by the BET method, of 0.1-20 m²/g and an average particle size of 0.05-20 μm,
(D) a crosslinker in an amount sufficient to cure the composition, the crosslinker being selected from the group consisting of (D1) organic peroxides, hydroperoxides, and mixtures thereof, and
(E) 0.01-10.0 parts by weight, based on 100 parts by weight of (A), of an inorganic base, inorganic acid, organic acid or a compound which liberates an inorganic base, inorganic acid, organic base or acid, or organosilicon acid or base on heating, an organic amine, aniline, dimethylaniline, toluidine, pyridine, and their alkyl-substituted derivatives, urea, N-alkylurea derivative or an N-triorganylsilylcarbamic ester, N-triorganylsilylcarbamate,or N- triorganylsilylurea.

* * * * *